(12) United States Patent
Amihood et al.

(10) Patent No.: US 12,038,498 B2
(45) Date of Patent: Jul. 16, 2024

(54) MULTI-RADAR SYSTEM

(71) Applicant: Google LLC, Mountain View, CA (US)

(72) Inventors: Patrick M. Amihood, Palo Alto, CA (US); Octavio Ponce Madrigal, Mountain View, CA (US)

(73) Assignee: Google LLC, Mountain View, CA (US)

( * ) Notice: Subject to any disclaimer, the term of this patent is extended or adjusted under 35 U.S.C. 154(b) by 439 days.

(21) Appl. No.: 17/349,597

(22) Filed: Jun. 16, 2021

(65) Prior Publication Data

US 2021/0396867 A1    Dec. 23, 2021

Related U.S. Application Data

(63) Continuation of application No. PCT/US2020/038199, filed on Jun. 17, 2020.

(51) Int. Cl.
*G01S 13/88* (2006.01)
*G06F 3/01* (2006.01)
*G06V 40/20* (2022.01)

(52) U.S. Cl.
CPC ............. *G01S 13/88* (2013.01); *G06F 3/011* (2013.01); *G06F 3/017* (2013.01); *G06V 40/20* (2022.01)

(58) Field of Classification Search
CPC .. G01S 13/88; G01S 2013/0272; G01S 7/026; G01S 7/292; G01S 7/34;
(Continued)

(56) References Cited

U.S. PATENT DOCUMENTS 8,723,957 B2 * 5/2014 Kim .................... G06F 1/325
901/17
8,949,639 B2 * 2/2015 Kamhi ................ G06F 1/3206
713/323
(Continued)

FOREIGN PATENT DOCUMENTS

EP    3598171    1/2020
WO   2018208958   11/2018
WO   2020040919   2/2020

OTHER PUBLICATIONS

Asim Ghaffar, Faheem Khan, Sung Ho Cho, Hand Pointing Gestures Based Digital Menu Board Implementation Using IR-UWB Transceivers, May 15, 2019, 10 pages (Year: 2019).*
(Continued)

*Primary Examiner* — Yongjia Pan
(74) *Attorney, Agent, or Firm* — Colby Nipper PLLC

(57) ABSTRACT

Techniques and apparatuses are described that implement a multi-radar system within a device and optimize operation of the multi-radar system. The multi-radar system includes two or more radar circuits located at different positions on the device. The multi-radar system also includes an optimization controller, which controls operational states of the radar circuits. In particular, the optimization controller determines respective operational states of the radar circuits to optimize performance of the multi-radar system under certain constraints. For example, the optimization controller can alter the respective operational states for different radar circuits responsive to detecting various trigger events. In this way, the optimization controller can selectively alter the operational states of the radar circuits for various situations.

20 Claims, 15 Drawing Sheets

(58) Field of Classification Search
CPC .......... G01S 7/354; G01S 7/415; G01S 7/417; G01S 13/04; G01S 13/10; G01S 13/32; G01S 13/42; G01S 13/56; G01S 13/582; G01S 13/584; G01S 13/87; G01S 7/025; G06F 3/011; G06F 3/017; G06V 40/20

See application file for complete search history.

(56) References Cited

U.S. PATENT DOCUMENTS

| | | | | |
|---|---|---|---|---|
| 9,049,663 | B2* | 6/2015 | Rabii | H04W 52/0254 |
| 9,389,690 | B2* | 7/2016 | Li | G06F 3/0304 |
| 10,101,819 | B2* | 10/2018 | Trattler | G06F 3/017 |
| 10,302,499 | B2* | 5/2019 | Dixon | G08B 29/26 |
| 10,609,285 | B2* | 3/2020 | Holz | H04N 23/61 |
| 10,613,619 | B2* | 4/2020 | Mukherjee | G06F 1/3293 |
| 2008/0234935 | A1* | 9/2008 | Wolf | G01C 19/02 |
| | | | | 701/472 |
| 2012/0105193 | A1* | 5/2012 | Gritti | G08B 13/19695 |
| | | | | 340/3.4 |
| 2012/0147531 | A1* | 6/2012 | Rabii | H04W 52/0254 |
| | | | | 361/679.01 |
| 2015/0206415 | A1* | 7/2015 | Wegelin | G08B 21/245 |
| | | | | 340/573.4 |
| 2018/0329501 | A1* | 11/2018 | Marchenko | G06F 3/038 |
| 2020/0066236 | A1 | 2/2020 | Giusti et al. | |

OTHER PUBLICATIONS

Shengchang Lan, Zonglong He, Kai Yao, Weichu Chen, Hand Gesture Recognition using a Three-dimensional 24 GHz Radar Array, 2018, 3 pages (Year: 2018).*

Qian Wan, Yiran Li, Changzhi Li, Ranadip Pal, Gesture recognition for smart home applications using portable radar sensors, 2014, 4 pages (Year: 2014).*

"International Preliminary Report on Patentability", Application No. PCT/US2020/038199, dated Dec. 13, 2022, 11 pages.

"International Search Report and Written Opinion", Application No. PCT/US2020/038199, dated Mar. 11, 2021, 15 pages.

* cited by examiner

```
                            ┌─ 900
```

- Cause a first radar circuit of a multi-radar system's two or more radar circuits to be in a first operational state
  902

- Cause a second radar circuit of the two or more radar circuits to be in a second operational state
  904

- Detect a trigger event that represents a change in an operating environment of the multi-radar system
  906

- Selectively alter operation of at least one of the first radar circuit or the second radar circuit responsive to detection of the trigger event
  908

FIG. 9

MULTI-RADAR SYSTEM

RELATED APPLICATION

This application is a continuation of and claims priority to PCT Application Serial No. PCT/US2020/038199, filed Jun. 17, 2020, which is incorporated herein by reference in its entirety.

BACKGROUND

Radars are useful devices that can detect objects. Relative to other types of sensors, like a camera, a radar can provide improved performance in the presence of different environmental conditions, such as low lighting and fog, or with moving or overlapping objects. Radar can also detect objects through one or more occlusions, such as a purse or a pocket. While there are many advantages to using radar, there are also many challenges associated with integrating radar in consumer devices.

Some challenges include size and layout constraints of the consumer device. These constraints can place restrictions on a radar's design. An example restriction can limit the quantity of antennas to decrease a footprint of the radar. The use of fewer antennas, however, can decrease the radar's sensitivity (e.g., ability to detect small objects or objects at far ranges) and angular resolution. Space constraints can also limit where the radar can be placed relative to other components within the electronic device. In some cases, these components generate interference, which can increase the radar system's false-alarm rate.

Other challenges involve power constraints within small or mobile consumer devices. Operation of some radars can significantly drain a battery of a consumer device and cause a user to frequently recharge the consumer device. Consequently, advantages of utilizing the radar may not be realized with the effective operation of the radar curtailed or disabled due to limitations of available power.

SUMMARY

Techniques and apparatuses are described that implement a multi-radar system within a device and optimizes operation of the multi-radar system. The multi-radar system includes two or more radar circuits. The radar circuits are distributed on the device at different positions. Each radar circuit includes at least one antenna and at least one transceiver. At least a portion of an antenna pattern of a first radar circuit can overlap an antenna pattern of a second radar circuit. By partitioning the antennas and transceivers across multiple radar circuits instead of consolidating into a single integrated circuit, the radar circuits can have a smaller footprint than the single integrated circuit. This smaller footprint enables the radar circuits to be integrated within space-constrained devices, which are more likely to have multiple smaller spaces available than a single large space. The smaller footprint also provides additional flexibility in positioning the radar circuits away from other components within the device that can cause interference. This can reduce the amount of interference seen by the multi-radar system. The radar data generated by the transceivers of the radar circuits can be processed individually by respective processors of the radar circuits or combined in a coherent or non-coherent manner by a shared processor.

There can be some challenges to operating the multiple radar circuits, such as in a same operational state. For example, operating all of the radar circuits in a similar manner can significantly increase power consumption of the multi-radar system and limit the battery life of a device. Additionally, some radar circuits can have different levels of performance depending on their position and the relative location of a detected object (e.g., user). Furthermore, different operational states can be optimal for different types of radar-based applications, such as presence detection, gesture recognition, vital-sign detection, collision avoidance, and so forth.

To address these challenges, the multi-radar system includes an optimization controller, which selectively controls respective operational states of the radar circuits. In particular, the optimization controller can determine operational states of the radar circuits to optimize performance of the multi-radar system under certain constraints. Example types of performance that can be optimized include signal-to-noise ratio (SNR) performance, angular estimation, or an F-score (e.g., recall and precision). Example constraints include power consumption, signal clipping (e.g., saturation), or interference. The optimization controller can determine different operational states for different radar circuits based on respective positioning of the radar circuits in a device and based on a current operating environment of the device (e.g., amount of available power within the device, an orientation of the device, an active radar-based application, or presence of a single user or multiple users). In this way, the optimization controller can selectively alter the operational states of the radar circuits for various situations to optimize performance of the multi-radar system.

Aspects below include a method performed by a multi-radar system implemented within a device. The multi-radar system comprises two or more radar circuits, which are at different positions on the device. The method comprises causing a first radar circuit of the two or more radar circuits to be in a first operational state and causing a second radar circuit of the two or more radar circuits to be in a second operational state. The method also comprises detecting a trigger event that represents a change in an operating environment of the multi-radar system. Responsive to detecting the trigger event, the method further comprises selectively altering operation of at least one of the first radar circuit or the second radar circuit. The selective altering comprises at least one of: causing the first radar circuit to be in a third operational state that is different than the first operational state or causing the second radar circuit to be in a fourth operational state that is different than the second operational state.

Aspects described below also include an apparatus comprising a multi-radar system. The multi-radar system comprises two or more radar circuits and a controller. The multi-radar system is configured to perform any of the methods described herein.

Aspects described below also include a means for optimizing operation of a multi-radar system.

BRIEF DESCRIPTION OF THE DRAWINGS

Apparatuses and techniques for optimizing operation of a multi-radar system are described with reference to the following drawings. The same numbers are used throughout the drawings to reference like features and components:

FIG. 3-1 illustrates an example operation of a radar circuit.

FIG. 3-2 illustrates an example radar framing structure.

FIG. 7-1 illustrates an example implementation of an optimization controller as part of a multi-radar system.

FIG. 7-2 illustrates an example scheme implemented by an optimization controller for optimizing operation of a multi-radar system.

FIG. 8-1 illustrates an example situation in which an optimization controller optimizes operation of a multi-radar system based on a detected change associated with a user.

FIG. 8-2 illustrates an example situation in which an optimization controller optimizes operation of a multi-radar system based on a detected change in an orientation of a user device.

FIG. 8-3 illustrates an example situation in which an optimization controller optimizes operation of a multi-radar system based on a detected presence of a user.

FIG. 8-4 illustrates an example situation in which an optimization controller optimizes operation of a multi-radar system based on a detected presence of multiple users.

FIG. 9 illustrates an example method performed by a multi-radar system.

DETAILED DESCRIPTION

Overview

Figure 1:
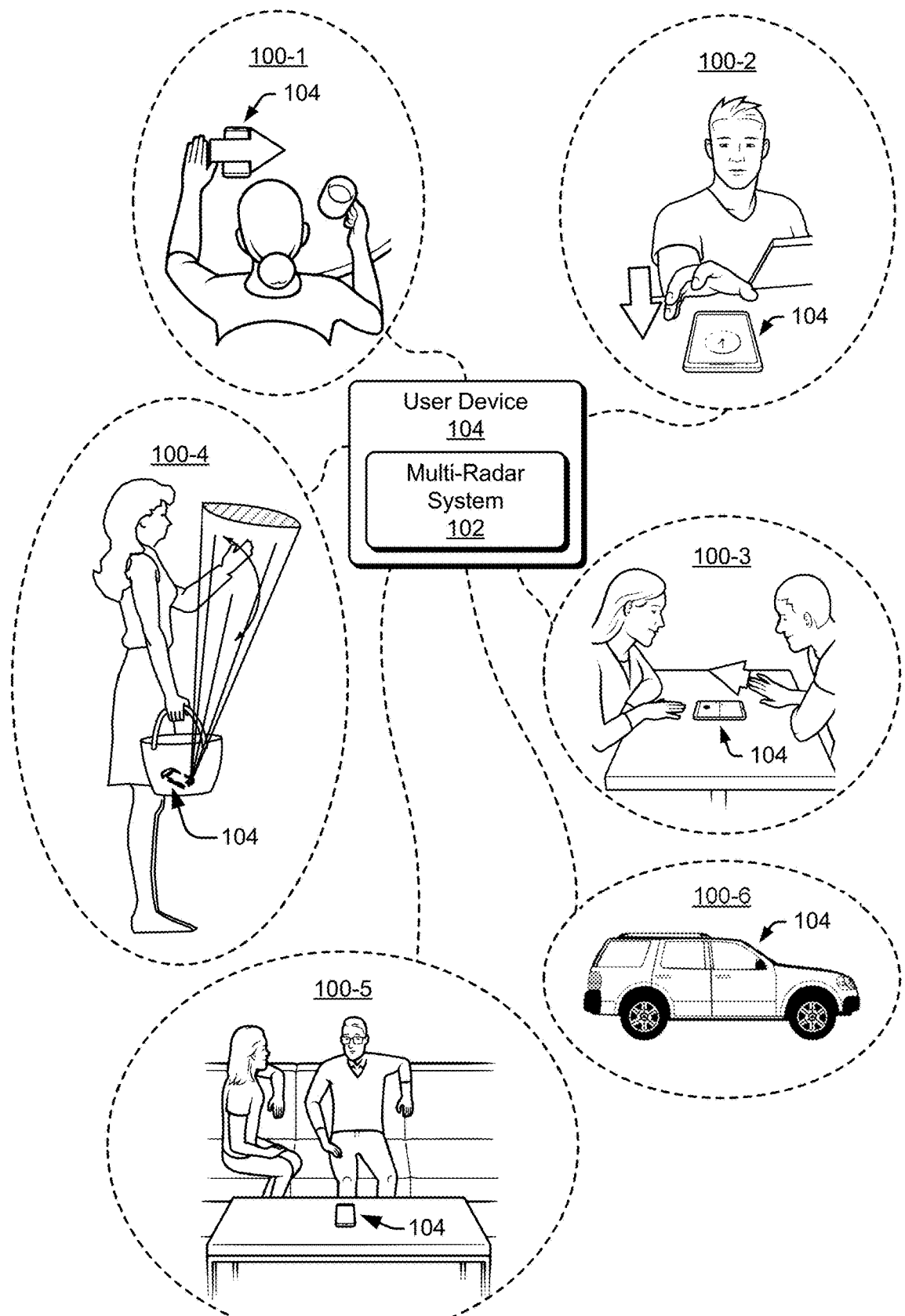
FIG. 1 illustrates example environments in which a multi-radar system of a user device can operate.

Integrating a radar system within a consumer device can be challenging. One such challenge involves size or layout constraints of the consumer device. To fit within an available space of the consumer device, a radar system can be implemented with fewer antennas to decrease the radar system's footprint. The use of fewer antennas, however, can decrease the radar system's sensitivity (e.g., ability to detect small objects or objects at far ranges) and angular resolution.

The size or layout constraints can also limit where the radar system can be placed relative to other components within the consumer device. In some cases, these components generate emissions or cause vibrations, which can interfere with the radar system. This interference can include, for instance, vibrations caused by an audible sound produced by a speaker of the consumer device or a wireless communication signal transmitted by a wireless transceiver of the consumer device.

Another challenge involves power constraints within small or mobile consumer devices. Operation of some radars can significantly drain a battery of a consumer device and cause a user to frequently recharge the consumer device. Consequently, advantages of utilizing the radar may not be realized with the effective operation of the radar curtailed or disabled due to limitations of available power.

To address these challenges, this document describes techniques and devices for implementing a multi-radar system and optimizing operation of the multi-radar system. The multi-radar system includes two or more radar circuits. The radar circuits are distributed on the device at different positions. Each radar circuit includes at least one antenna and at least one transceiver. At least a portion of an antenna pattern of a first radar circuit overlaps an antenna pattern of a second radar circuit. By partitioning the antennas and transceivers across multiple radar circuits instead of consolidating into a single integrated circuit, the radar circuits can have a smaller footprint than the single integrated circuit. This smaller footprint enables the radar circuits to be integrated within space-constrained devices, which are more likely to have multiple smaller spaces available than a single large space. The smaller footprint also provides additional flexibility in positioning the radar circuits away from other components within the device that can cause interference. This can reduce the amount of interference seen by the multi-radar system. The radar data generated by the transceivers of the radar circuits can be processed individually by respective processors of the radar circuits or combined in a coherent or non-coherent manner by a shared processor.

There can be some challenges to operating the multiple radar circuits, such as in a same operational state. For example, operating all of the radar circuits in a similar manner can significantly increase power consumption of the multi-radar system and limit the battery life of a device. Additionally, some radar circuits can have different levels of performance depending on their position and the relative location of a detected object (e.g., user). Furthermore, different operational states can be optimal for different types of radar-based applications, such as presence detection, gesture recognition, vital-sign detection, collision avoidance, and so forth.

To address these challenges, the multi-radar system includes an optimization controller, which selectively controls respective operational states of the radar circuits. In particular, the optimization controller can determine operational states of the radar circuits to optimize performance of the multi-radar system under certain constraints. Example types of performance that can be optimized include signal-to-noise ratio (SNR) performance, angular estimation, or an F-score (e.g., recall and precision). Example constraints include power consumption, signal clipping (e.g., saturation), or interference. The optimization controller can determine different operational states for different radar circuits based on respective positioning of the radar circuits in a device and based on a current operating environment of the device (e.g., amount of available power within the device, an orientation of the device, an active radar-based application, or presence of a single user or multiple users). In this way, the optimization controller can selectively alter the operational states of the radar circuits for various situations to optimize performance of the multi-radar system.

Example Environment

FIG. 1 is an illustration of example environments 100-1 to 100-6 in which techniques using, and an apparatus including, a multi-radar system 102 may be embodied. In the depicted environments 100-1 to 100-6, the multi-radar system 102 of a user device 104 is capable of detecting one or more objects (e.g., users). The user device 104 is shown to be a smartphone in environments 100-1 to 100-5 and a smart vehicle in the environment 100-6. In general, the user device 104 may, e.g., be a user device comprising a computer processor and computer-readable media.

In the environments 100-1 to 100-4, a user performs different types of gestures, which are detected by the multi-radar system 102. In some cases, the user performs a gesture using an appendage or body part. Alternatively, the user can also perform a gesture using a stylus, a hand-held object, a ring, or any type of material that can reflect radar signals.

In environment 100-1, the user makes a scrolling gesture by moving a hand above the user device 104 along a horizontal dimension (e.g., from a left side of the user device 104 to a right side of the user device 104). In the environment 100-2, the user makes a reaching gesture, which decreases a distance between the user device 104 and the user's hand. The users in environment 100-3 make hand gestures to play a game on the user device 104. In one instance, a user makes a pushing gesture by moving a hand above the user device 104 along a vertical dimension (e.g., from a bottom side of the user device 104 to a top side of the user device 104). In the environment 100-4, the user device 104 is stored within a purse, and the multi-radar system 102 provides occluded-gesture recognition by detecting gestures that are occluded by the purse.

The multi-radar system 102 can also recognize other types of gestures or motions not shown in FIG. 1. Example types of gestures include a knob-turning gesture in which a user curls their fingers to grip an imaginary doorknob and rotate their fingers and hand in a clockwise or counter-clockwise fashion to mimic an action of turning the imaginary doorknob. Another example type of gesture includes a spindle-twisting gesture, which a user performs by rubbing a thumb and at least one other finger together. The gestures can be two-dimensional, such as those used with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the user device 104 can perform an action, such as display new content, move a cursor, activate one or more sensors, open an application, and so forth. In this way, the multi-radar system 102 provides touch-free control of the user device 104.

In the environment 100-5, the multi-radar system 102 generates a three-dimensional map of a surrounding environment for contextual awareness. The multi-radar system 102 also detects and tracks multiple users to enable both users to interact with the user device 104. The multi-radar system 102 can also perform vital-sign detection. In the environment 100-6, the multi-radar system 102 monitors vital signs of a user that drives a vehicle. Example vital signs include a heart rate and a respiration rate. If the multi-radar system 102 determines that the driver is falling asleep, for instance, the multi-radar system 102 can cause the user device 104 to alert the user. Alternatively, if the multi-radar system 102 detects a life threatening emergency, such as a heart attack, the multi-radar system 102 can cause the user device 104 to alert a medical professional or emergency services. The user device 104 and the multi-radar system 102 are further described with respect to FIG. 2.

Example Multi-Radar System

Figure 2:
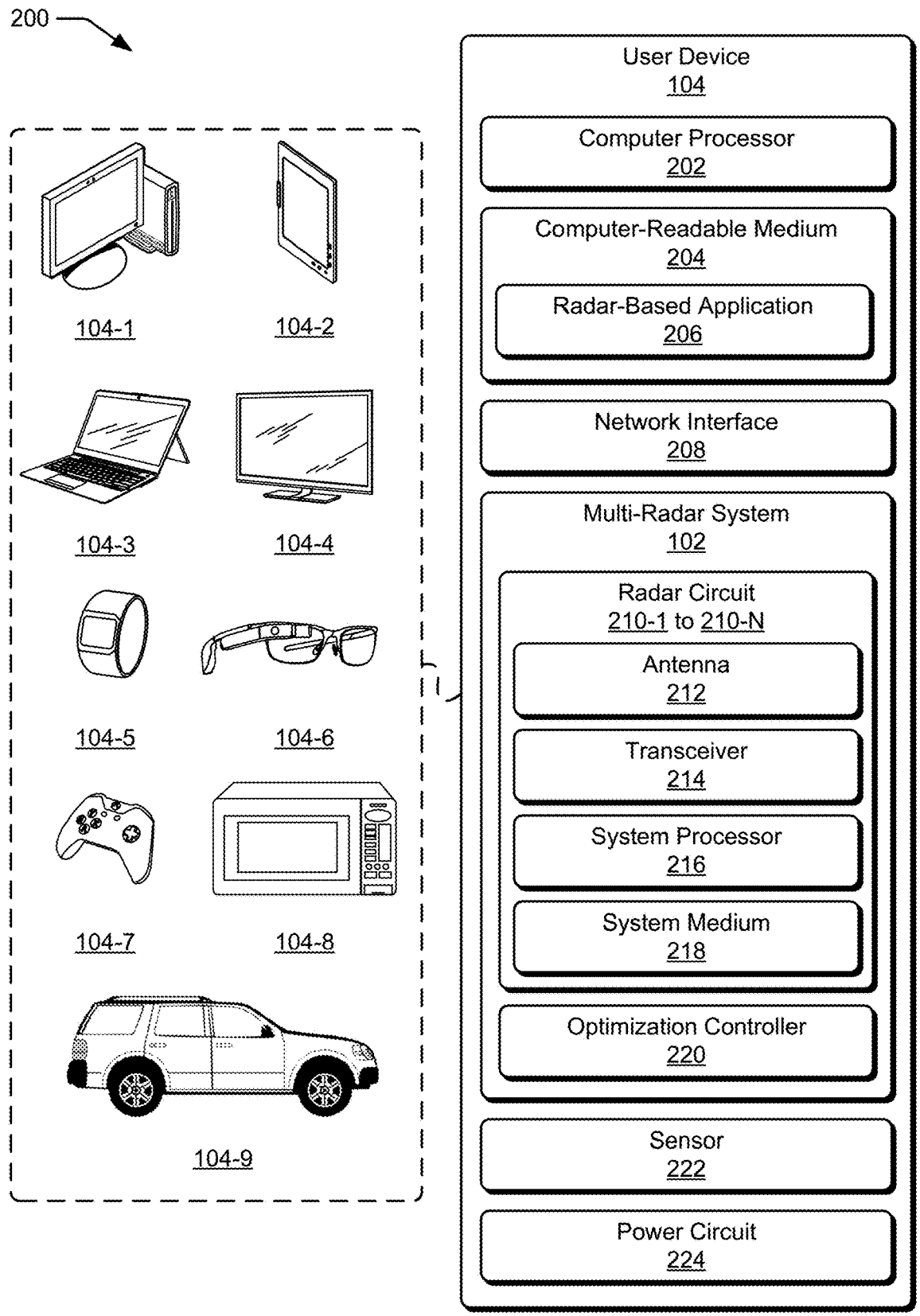
FIG. 2 illustrates an example implementation of a multi-radar system as part of a user device.

FIG. 2 illustrates the multi-radar system 102 as part of the user device 104. The user device 104 is illustrated with various non-limiting example devices including a desktop computer 104-1, a tablet 104-2, a laptop 104-3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a security camera, a baby monitor, a Wi-Fi™ router, a drone, a trackpad, a drawing pad, a netbook, an e-reader, a home-automation and control system, a wall display, a virtual reality headset, and another home appliance. Note that the user device 104 can be wearable, non-wearable but mobile, or relatively immobile (e.g., desktops and appliances). The multi-radar system 102 can be used as a stand-alone radar system or used with, or embedded within, many different user devices 104 or peripherals, such as in control panels that control home appliances and systems, in automobiles to control internal functions (e.g., volume, cruise control, or even driving of the car), or as an attachment to a laptop computer to control computing applications on the laptop.

The user device 104 includes one or more computer processors 202 and one or more computer-readable medium 204, which includes memory media and storage media. Applications and/or an operating system (not shown) embodied as computer-readable instructions on the computer-readable medium 204 can be executed by the computer processor 202 to provide some of the functionalities described herein. The computer-readable medium 204 also includes a radar-based application 206, which uses data generated by the multi-radar system 102 to perform a function, such as presence detection, gesture-based touch-free control, collision avoidance for autonomous driving, human vital-sign notification, and so forth.

The user device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The user device 104 may also include a display (not shown).

The multi-radar system 102 includes two or more radar circuits 210-1 to 210-N, where N represents a positive integer. The radar circuits 210 are individual circuits (e.g., separate integrated circuits), which can be positioned at different positions on the user device 104 (e.g., within an interior of the user device 104 or mounted to an exterior surface of the user device 104). Each radar circuit 210 includes at least one antenna 212 and at least one transceiver 214 to transmit and/or receive radar signals. In some cases, the radar circuit 210 includes a single antenna 212 coupled to a single transceiver 214, which can together transmit and receive radar signals to implement a pulse-Doppler radar. In other cases, the radar circuit 210 includes at least one antenna coupled to a transmitter of the transceiver 214 and at least one other antenna coupled to a receiver of the transceiver 214 to implement a continuous-wave radar. The antenna 212 can be circularly polarized, horizontally polarized, or vertically polarized. The antenna 212 can be implemented together with the transceiver 214 on a same integrated circuit or implemented separate from the integrated circuit that includes the transceiver 214.

In some implementations, the radar circuit 210 includes multiple antennas 212, which represent antenna elements of one or more antenna arrays. An antenna array enables the radar circuit 210 to use analog or beamforming techniques during transmission and/or reception to improve the sensitivity and angular resolution of the multi-radar system 102. Consider an example in which the radar circuit 210 includes an antenna 212 for transmission, and multiple antennas 212, which form receive antenna elements of an antenna array, for reception. The receive antenna elements can be positioned to form a one-dimensional shape (e.g., a line) or a two-dimensional shape (e.g., a rectangular arrangement, a triangular arrangement, or an "L" shape arrangement) for implementations that include three or more receive antenna elements. The one-dimensional shape enables the radar circuit 210 to measure one angular dimension (e.g., an azimuth or an elevation) while the two-dimensional shape enables the radar circuit 210 to measure two angular dimensions (e.g., both azimuth and elevation). An element spacing associated with the receive antenna elements can be less than, greater than, or equal to half a center wavelength of the radar signal.

The radar circuits 210-1 to 210-N can individually or jointly form beams that are steered or un-steered, wide or narrow, or shaped (e.g., hemisphere, cube, fan, cone, cylinder). The steering and shaping can be achieved through analog beamforming or digital beamforming. In some implementations, at least a portion of the antennas 212 within the radar circuits 210-1 to 210-N have, for instance, an un-steered omnidirectional radiation pattern or can produce a wide steerable beam to illuminate a large volume of space during transmission. To achieve target angular accuracies and angular resolutions, a remaining portion of the antennas 212 within the radar circuits 210-1 to 210-N can be used to generate hundreds or thousands of narrow steered beams with digital beamforming during reception. In this way, the multi-radar system 102 can efficiently monitor an external environment and detect one or more users.

The transceiver 214 includes circuitry and logic for transmitting and/or receiving radar signals via the antenna 212. Components of the transceiver 214 can include amplifiers, mixers, switches, analog-to-digital converters, digital-to-analog converters, or filters for conditioning the radar signals. The transceiver 214 also includes logic to perform in-phase/quadrature (I/Q) operations, such as modulation or demodulation. A variety of modulations can be used, including linear frequency modulations, triangular frequency modulations, stepped frequency modulations, or phase modulations. Alternatively, the transceiver 214 can produce radar signals having a relatively constant frequency or a single tone. The transceiver 214 can be configured to support continuous-wave or pulsed radar operations.

A frequency spectrum (e.g., range of frequencies) that the transceiver 214 uses to generate the radar signals can encompass frequencies between 1 and 400 gigahertz (GHz), between 4 and 100 GHz, between 1 and 24 GHz, between 2 and 4 GHz, between 57 and 64 GHz, or at approximately 2.4 GHz. In some cases, the frequency spectrum can be divided into multiple sub-spectrums that have similar or different bandwidths. The bandwidths can be on the order of 500 megahertz (MHz), 1 GHz, 2 GHz, and so forth. Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar circuits 210-1 to 210-N can each include one or more system processors 216 and one or more system medium 218 (e.g., one or more computer-readable storage medium). The system processor 216 executes instructions stored within the system medium 218 to analyze information provided by the transceiver 214 and provide data from the radar-based application 206. For example, the system processor 216 can perform Fourier Transform (FT) operations, perform presence detection, gesture recognition, collision avoidance, or vital-sign detection.

Although the system processor 216 and the system medium 218 is shown to be implemented within each radar circuit 210-1 to 210-N, alternative implementations share the system processor 216 and the system medium 218 across two or more of the radar circuits 210-1 to 210-N to implement a distributed radar system. The transceivers 214 of the radar circuits 210-1 to 210-N are coupled to the shared system processor 216, which combines the information provided by the transceiver 214 in a coherent or non-coherent manner. The system processor 216 can also compensate for differences in performance, position, or phase across the radar circuits 210-1 to 210-N. In this way, the shared system processor 216 can increase a signal-to-noise ratio of the multi-radar system 102 to enable the multi-radar system 102 to achieve a similar detection range and volume coverage as a non-distributed radar system that is implemented on a single integrated circuit. This also enables the multi-radar system 102 to realize higher angular resolution and sensitivity compared to implementing a radar system with a single radar circuit.

The multi-radar system 102 also includes an optimization controller 220, which can be implemented using hardware, software, firmware, or a combination thereof. The optimization controller 220 can include at least one processor and at least one computer-readable storage medium. The optimization controller 220 can be localized at one module or one integrated circuit chip, or can be distributed across multiple modules and chips. In various implementations, the optimization controller 220 can be implemented as part of at least one of the radar circuits 210-1 to 210-N or the computer processor 202. In an example implementation, the optimization controller 220 is integrated within the radar circuit 210-1, which enables the radar circuit 210-1 and the other radar circuits 210-2 to 210-N to have a master-slave relationship with the radar circuit 210-1 operating as the master and the other radar circuits 210-2 to 210-N operating as slaves.

The optimization controller 220 dynamically determines operational states of each radar circuit 210-1 to 210-N to customize performance of the multi-radar system 102 according to different operating environments. In particular, the optimization controller 220 can cause the radar circuits 210-1 to 210-N to operate according to operational states that improve signal-to-noise ratio performance, improve angular estimation, or improve an F-score within given constraints, such as power consumption, signal clipping, or interference. The operational states of the radar circuits 210-1 to 210-N are further described with respect to FIG. 6. The optimization controller 220 is further described with respect to FIGS. 7-1 and 7-2.

The user device 104 can also include at least one sensor 222 and at least one power circuit 224. The sensor 222 can include a gyroscope, an inertial sensor, an accelerometer, an infrared sensor, a camera, a global navigation satellite system, a magnetometer, a barometer, an ambient light sensor, and so forth. Generally, the sensor 222 measures environmental conditions. The power circuit 224 can include a battery, a wireless charging system, a power-management integrated circuit (PMIC), or some combination thereof. The power circuit 224 provides power to the components of the user device 104, including the multi-radar system 102. In some examples, the optimization controller 220 utilizes information provided by the sensor 222 or the power circuit 224 to determine operational states of the radar circuits 210-1 to 210-N, as further described with respect to FIG. 7-1. Operation of the multi-radar system 102 is further described with respect to FIGS. 3-1 and 3-2.

Figures 1, 3:
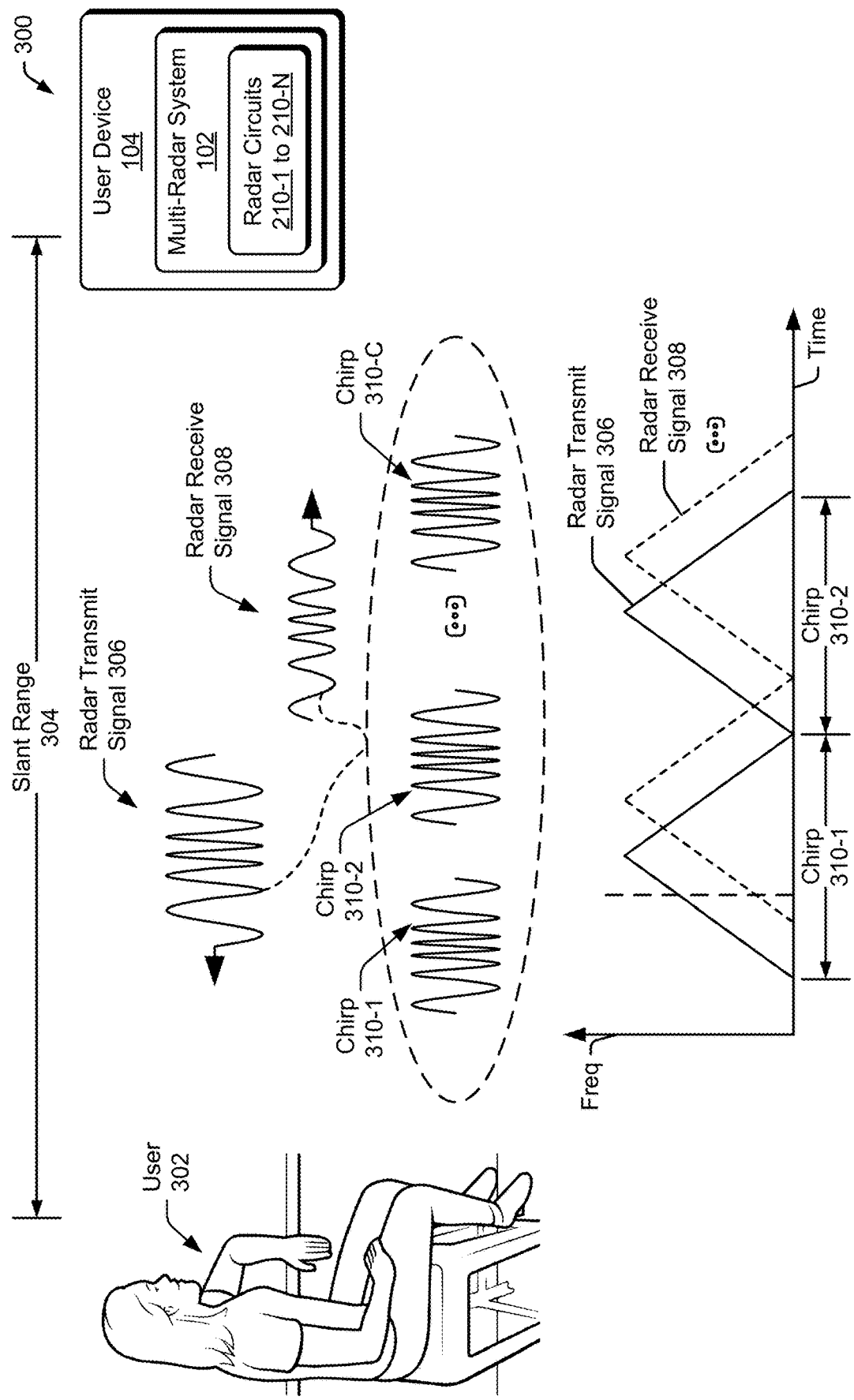
Figures 2, 3:
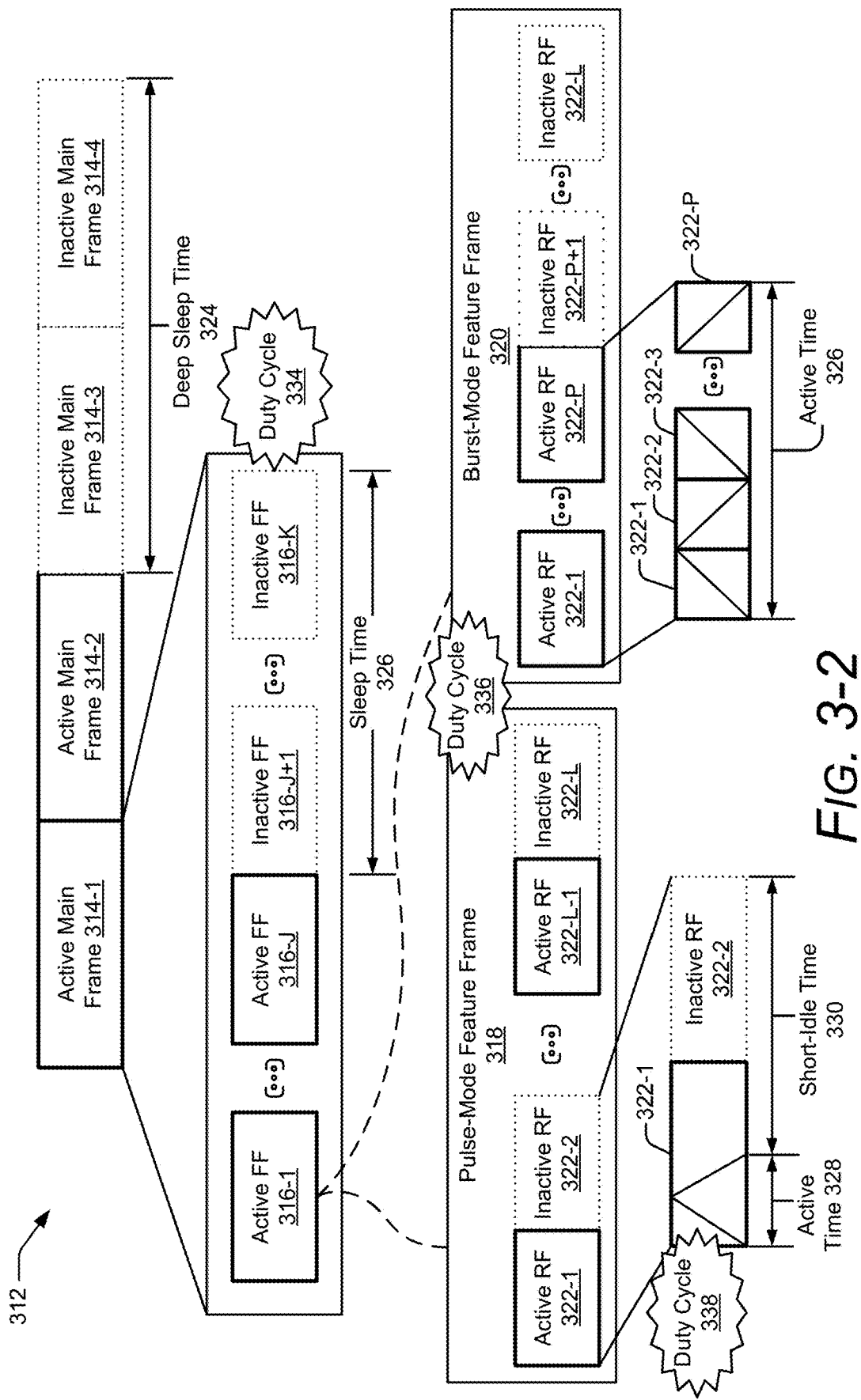

FIG. 3-1 illustrates an example operation of the multi-radar system 102. In the depicted configuration, the multi-radar system 102 is implemented as a frequency-modulated continuous-wave radar. However, other types of radar architectures can be implemented, as described above with respect to FIG. 2. In environment 300, a user 302 is located at a particular slant range 304 from the multi-radar system 102. To detect the user 302, one or more of the radar circuits 210-1 to 210-N transmit a radar transmit signal 306. At least a portion of the radar transmit signal 306 is reflected by the user 302. This reflected portion represents a radar receive signal 308. One or more of the radar circuits 210-1 to 210-N receive the radar receive signal 308 and process the radar receive signal 308 to extract data for the radar-based application 206. As depicted, an amplitude of the radar receive signal 308 is smaller than an amplitude of the radar transmit signal 306 due to losses incurred during propagation and reflection.

The radar transmit signal 306 includes a sequence of chirps 310-1 to 310-C, where C represents a positive integer greater than one. Each radar circuit 210 can transmit the chirps 310-1 to 310-C in a continuous burst or transmit the chirps 310-1 to 310-C as time-separated pulses, as further described with respect to FIG. 3-2. A duration of each chirp 310-1 to 310-C can be on the order of tens or thousands of microseconds (e.g., between approximately 30 microseconds (μs) and 5 milliseconds (ms)), for instance.

Individual frequencies of the chirps 310-1 to 310-C can increase or decrease over time. In the depicted example, an example radar circuit 210 employs a two-slope cycle (e.g., triangular frequency modulation) to linearly increase and linearly decrease the frequencies of the chirps 310-1 to 310-C over time. The two-slope cycle enables the radar circuit 210 to measure the Doppler frequency shift caused by motion of the user 302. In general, transmission characteristics of the chirps 310-1 to 310-C (e.g., bandwidth, center frequency, duration, and transmit power) can be tailored to achieve a particular detection range, range resolution, or doppler sensitivity for detecting one or more characteristics the user 302 or one or more actions performed by the user 302.

At the radar circuit 210, the radar receive signal 308 represents a delayed version of the radar transmit signal 306. The amount of delay is proportional to the slant range 304 (e.g., distance) from the antenna 212 of the radar circuit 210 to the user 302. In particular, this delay represents a summation of a time it takes for the radar transmit signal 306 to propagate from the radar circuit 210 to the user 302 and a time it takes for the radar receive signal 308 to propagate from the user 302 to the radar circuit 210. If the user 302 and/or the radar circuit 210 is moving, the radar receive signal 308 is shifted in frequency relative to the radar transmit signal 306 due to the Doppler effect. In other words, characteristics of the radar receive signal 308 are dependent upon motion of the hand and/or motion of the radar circuit 210. Similar to the radar transmit signal 306, the radar receive signal 308 is composed of one or more of the chirps 310-1 to 310-C.

The multiple chirps 310-1 to 310-C enable the radar circuit 210 to make multiple observations of the user 302 over a predetermined time period. A radar framing structure determines a timing of the chirps 310-1 to 310-C, as further described with respect to FIG. 3-2.

FIG. 3-2 illustrates an example radar framing structure 312. In the depicted configuration, the radar framing structure 312 includes three different types of frames. At a top level, the radar framing structure 312 includes a sequence of main frames 314, which can be in the active state or the inactive state. Generally speaking, the active state consumes a larger amount of power relative to the inactive state. At an intermediate level, the radar framing structure 312 includes a sequence of feature frames 316, which can similarly be in the active state or the inactive state. Different types of feature frames 316 include a pulse-mode feature frame 318 (shown at the bottom-left of FIG. 3-2) and a burst-mode feature frame 320 (shown at the bottom-right of FIG. 3-2). At a low level, the radar framing structure 312 includes a sequence of radar frames (RF) 322, which can also be in the active state or the inactive state.

The radar circuit 210 transmits and receives a radar signal during an active radar frame 322. In some situations, the radar frames 322 are individually analyzed for basic radar operations, such as search and track, clutter map generation, user location determination, and so forth. Radar data collected during each active radar frame 322 can be saved to a buffer after completion of the radar frame 322 or provided directly to the system processor 216 of FIG. 2.

The radar circuit 210 analyzes the radar data across multiple radar frames 322 (e.g., across a group of radar frames 322 associated with an active feature frame 316) to identify a particular feature. Example types of features include a particular type of motion, a motion associated with a particular appendage (e.g., a hand or individual fingers), and a feature associated with different portions of the gesture. To recognize a gesture performed by the user 302 during an active main frame 314, the radar circuit 210 analyzes the radar data associated with one or more active feature frames 316.

A duration of the main frame 314 may be on the order of milliseconds or seconds (e.g., between approximately 10 ms and 10 seconds (s)). After active main frames 314-1 and 314-2 occur, the radar circuit 210 is inactive, as shown by inactive main frames 314-3 and 314-4. A duration of the inactive main frames 314-3 and 314-4 is characterized by a deep sleep time 324, which may be on the order of tens of milliseconds or more (e.g., greater than 50 ms). In an example implementation, the radar circuit 210 turns off all of the active components (e.g., an amplifier, an active filter, a voltage-controlled oscillator (VCO), a voltage-controlled buffer, a multiplexer, an analog-to-digital converter, a phase-lock loop (PLL) or a crystal oscillator) within the transceiver 214 to conserve power during the deep sleep time 324.

In the depicted radar framing structure 312, each main frame 314 includes K feature frames 316, where K is a positive integer. If the main frame 314 is in the inactive state, all of the feature frames 316 associated with that main frame 314 are also in the inactive state. In contrast, an active main frame 314 includes J active feature frames 316 and K-J inactive feature frames 316, where J is a positive integer that is less than or equal to K. A quantity of feature frames 316 can be adjusted based on a complexity of the environment or a complexity of a gesture. For example, a main frame 314 can include a few to a hundred feature frames 316 (e.g., K may equal 2, 10, 30, 60, or 100). A duration of each feature frame 316 may be on the order of milliseconds (e.g., between approximately 1 ms and 50 ms).

To conserve power, the active feature frames 316-1 to 316-J occur prior to the inactive feature frames 316-(J+1) to 316-K. A duration of the inactive feature frames 316-(J+1) to 316-K is characterized by a sleep time 326. In this way, the inactive feature frames 316-(J+1) to 316-K are consecutively executed such that the radar circuit 210 can be in a powered-down state for a longer duration relative to other techniques that may interleave the inactive feature frames 316-(J+1) to 316-K with the active feature frames 316-1 to 316-J. Generally speaking, increasing a duration of the sleep time 326 enables the radar circuit 210 to turn off components within the transceiver 214 that require longer start-up times.

Each feature frame 316 includes L radar frames 322, where L is a positive integer that may or may not be equal to J or K. In some implementations, a quantity of radar frames 322 may vary across different feature frames 316 and may comprise a few frames or hundreds of frames (e.g., L may equal 5, 15, 30, 100, or 500). A duration of a radar frame 322 may be on the order of tens or thousands of microseconds (e.g., between approximately 30 μs and 5 ms). The radar frames 322 within a particular feature frame 316 can be customized for a predetermined detection range, range resolution, or doppler sensitivity, which facilitates detection of a particular feature or gesture. For example, the radar frames 322 may utilize a particular type of modulation, bandwidth, frequency, transmit power, or timing. If the feature frame 316 is in the inactive state, all of the radar frames 322 associated with that feature frame 316 are also in the inactive state.

The pulse-mode feature frame 318 and the burst-mode feature frame 320 include different sequences of radar frames 322. Generally speaking, the radar frames 322 within an active pulse-mode feature frame 318 transmit pulses that are separated in time by a predetermined amount. This disperses observations over time, which can make it easier for the radar circuit 210 to recognize a gesture due to larger changes in the observed chirps 310-1 to 310-C within the pulse-mode feature frame 318 relative to the burst-mode feature frame 320. In contrast, the radar frames 322 within an active burst-mode feature frame 320 transmit pulses continuously across a portion of the burst-mode feature frame 320 (e.g., the pulses are not separated by a predetermined amount of time). This enables an active-burst-mode feature frame 320 to consume less power than the pulse-mode feature frame 318 by turning off a larger quantity of components, including those with longer start-up times, as further described below.

Within each active pulse-mode feature frame 318, the sequence of radar frames 322 alternates between the active state and the inactive state. Each active radar frame 322 transmits a chirp 310 (e.g., a pulse), which is illustrated by a triangle. A duration of the chirp 310 is characterized by an active time 328. During the active time 328, components within the transceiver 214 are powered-on. During a short-idle time 330, which includes the remaining time within the active radar frame 322 and a duration of the following inactive radar frame 322, the radar circuit 210 conserves power by turning off one or more active components within the transceiver 214 that have a start-up time within a duration of the short-idle time 330.

An active burst-mode feature frame 320 includes P active radar frames 322 and L-P inactive radar frames 322, where P is a positive integer that is less than or equal to L. To conserve power, the active radar frames 322-1 to 322-P occur prior to the inactive radar frames 322-(P+1) to 322-L. A duration of the inactive radar frames 322-(P+1) to 322-L is characterized by a long-idle time 332. By grouping the inactive radar frames 322-(P+1) to 322-L together, the radar circuit 210 can be in a powered-down state for a longer duration relative to the short-idle time 330 that occurs during the pulse-mode feature frame 318. Additionally, the radar circuit 210 can turn off additional components within the transceiver 214 that have start-up times that are longer than the short-idle time 330 and shorter than the long-idle time 332.

Each active radar frame 322 within an active burst-mode feature frame 320 transmits a portion of the chirp 310. In this example, the active radar frames 322-1 to 322-P alternate between transmitting a portion of the chirp 310 that increases in frequency and a portion of the chirp 310 that decreases in frequency.

The radar framing structure 312 enables power to be conserved through adjustable duty cycles within each frame type. A first duty cycle 334 is based on a quantity of active feature frames 316 (J) relative to a total quantity of feature frames 316 (K). A second duty cycle 336 is based on a quantity of active radar frames 322 (e.g., L/2 or P) relative to a total quantity of radar frames 322 (L). A third duty cycle 338 is based on a duration of the chirp 310 relative to a duration of a radar frame 322.

Consider an example radar framing structure 312 for a power state that consumes approximately 2 milliwatts (mW) of power and has a main-frame update rate (e.g., frame rate) between approximately 1 and 4 hertz (Hz). An update rate or a frame rate represents a rate at which particular frames (e.g., the main frames 314, the feature frames 316, or the radar frames 322) are scheduled. In this example, the radar framing structure 312 includes a main frame 314 with a duration between approximately 250 ms and 1 second. The main frame 314 includes thirty-one pulse-mode feature frames 318 (e.g., K is equal to 31). One of the thirty-one pulse-mode feature frames 318 is in the active state. This results in the duty cycle 334 being approximately equal to 3.2%. A duration of each pulse-mode feature frame 318 is between approximately 8 and 32 ms. Each pulse-mode feature frame 318 is composed of eight radar frames 322 (e.g., L is equal to 8). Within the active pulse-mode feature frame 318, all eight radar frames 322 are in the active state. This results in the duty cycle 336 being equal to 100%. A duration of each radar frame 322 is between approximately 1 and 4 ms. An active time 328 within each of the active radar frames 322 is between approximately 32 and 128 μs. As such, the resulting duty cycle 338 is approximately 3.2%. This example radar framing structure 312 can result in adequate near-range detection, gesture recognition, and presence detection while also conserving power. Generation of the radar transmit signal 306 (of FIG. 3-1) and the processing of the radar receive signal 308 (of FIG. 3-1) are further described with respect to FIG. 4.

Figure 4:
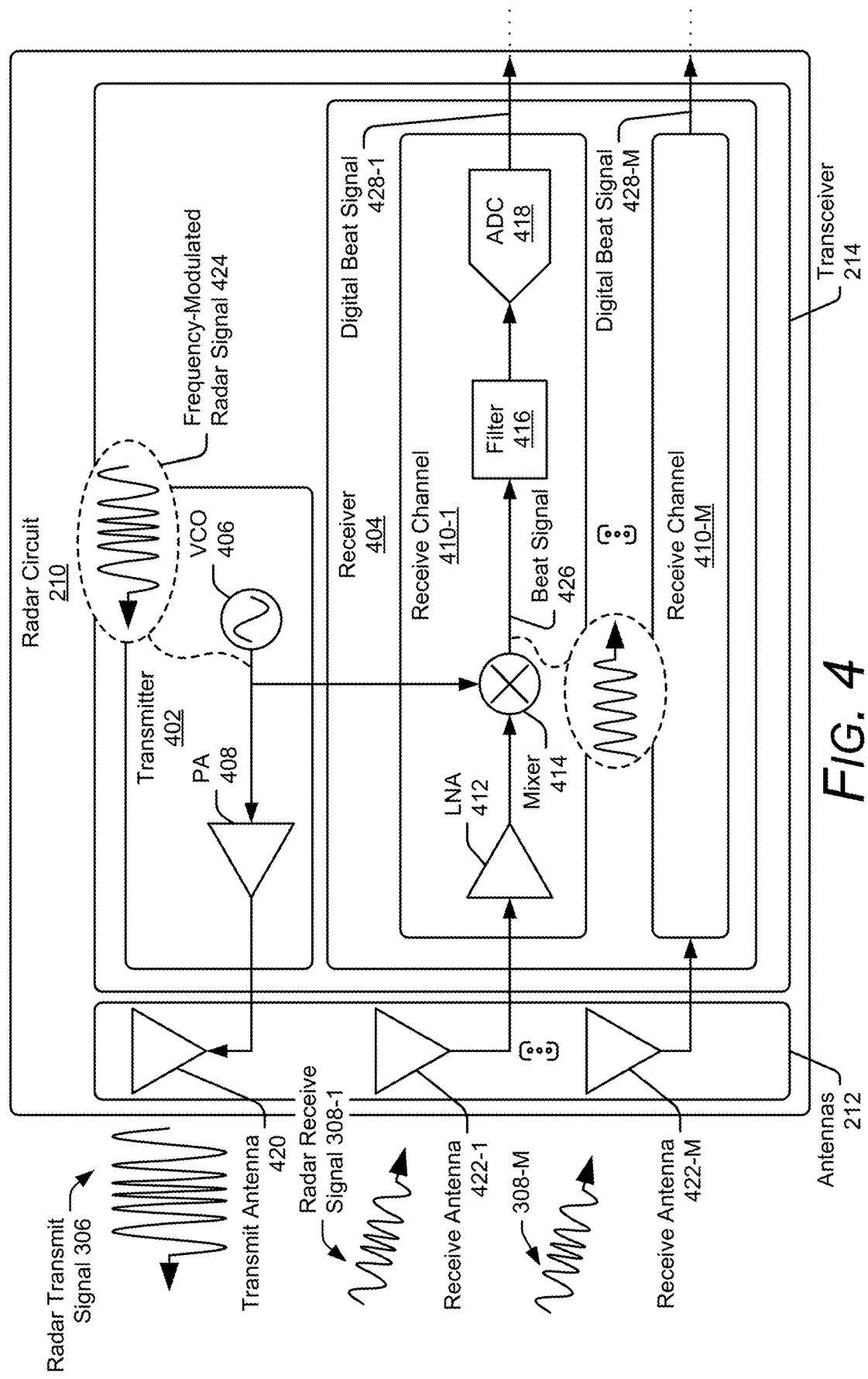
FIG. 4 illustrates an example radar circuit of a multi-radar system.

FIG. 4 illustrates an example radar circuit 210 of the multi-radar system 102. In the depicted configuration, the radar circuit 210 implements a portion of a frequency-modulated continuous-wave radar. However, other types of radar architectures can be implemented, as described above with respect to FIG. 2. The transceiver 214 of the radar circuit 210 includes at least one transmitter 402 and at least one receiver 404. The transmitter 402 includes at least one voltage-controlled oscillator 406 and at least one power amplifier (PA) 408. The receiver 404 includes one or more receive channels 410-1 to 410-M, where M is a positive integer. Each receive channel 410-1 to 410-M includes at least one low-noise amplifier (LNA) 412, at least one mixer 414, at least one filter 416, and at least one analog-to-digital converter 418.

The radar circuit 210 also includes multiple antennas 212, which include at least one transmit antenna 420 and at least two receive antennas 422-1 to 422-M. The transmit antenna 420 is coupled to the transmitter 402. The receive antennas 422-1 to 422-M form an antenna array, such as a linear antenna array, and are respectively coupled to the receive channels 410-1 to 410-M. Although the radar circuit 210 of FIG. 4 is shown to include multiple receive antennas 422-1 to 422-M and multiple receive channels 410-1 to 410-M, other implementations can include a single receive antenna 422 and a single receive channel 410.

During transmission, the voltage-controlled oscillator 406 generates a frequency-modulated radar signal 424 at radio frequencies. The frequency-modulated radar signal 424 can include a sequence of chirps. The chirps can be transmitted in a continuous burst or as time-separated pulses. A duration of each chirp can be on the order of tens or thousands of microseconds (e.g., between approximately 40 microseconds (µs) and 5 milliseconds (ms)), for instance.

Individual frequencies of the chirps can increase or decrease over time. As an example, the radar circuit 210 employs a two-slope cycle (e.g., triangular frequency modulation) to linearly increase and linearly decrease the frequencies of the chirps over time. The two-slope cycle enables the radar circuit 210 to measure the Doppler frequency shift caused by motion of an user (or object). In general, transmission characteristics of the chirps (e.g., bandwidth, center frequency, duration, and transmit power) can be tailored to achieve a particular detection range, range resolution, or doppler sensitivity for detecting one or more characteristics the user or one or more actions performed by the user.

During operation, the power amplifier 408 amplifies the frequency-modulated radar signal 424 for transmission via the transmit antenna 420. The transmitted frequency-modulated radar signal 424 is represented by a radar transmit signal 306. The radar circuit 210 receives and processes the radar receive signal 308. In particular, each receive antenna 422-1 to 422-M receives a version of the radar receive signal 308-1 to 308-M. In general, relative phase differences between these versions of the radar receive signals 308-1 to 308-M are due to differences in locations of the receive antennas 422-1 to 422-M. Within each receive channel 410-1 to 410-M, the low-noise amplifier 412 amplifies the radar receive signal 308, and the mixer 414 mixes the amplified radar receive signal 308 with the frequency-modulated radar signal 424. In particular, the mixer performs a beating operation, which downconverts and demodulates the radar receive signal 308 using the frequency-modulated radar signal 424 to generate a beat signal 426.

A frequency of the beat signal 426 represents a frequency difference between the frequency-modulated radar signal 424 and the radar receive signal 308, which is proportional to the slant range to the user. Although not shown, the beat signal 426 can include multiple frequencies, which represents reflections from different portions of the user (e.g., different fingers, different portions of a hand, or different body parts). In some cases, these different portions move at different speeds, move in different directions, or are positioned at different slant ranges relative to the radar circuit 210.

The filter 416 filters the beat signal 426, and the analog-to-digital converter 418 digitizes the filtered beat signal 426. The receive channels 410-1 to 410-M respectively generate digital beat signals 428-1 to 428-M, which are provided to the system processor 216 for processing. The receive channels 410-1 to 410-M of the transceiver 214 are coupled to the system processor 216. Multiple instances of the radar circuit 210 can be implemented within the user device 104, as further described with respect to FIG. 5.

Figure 5:
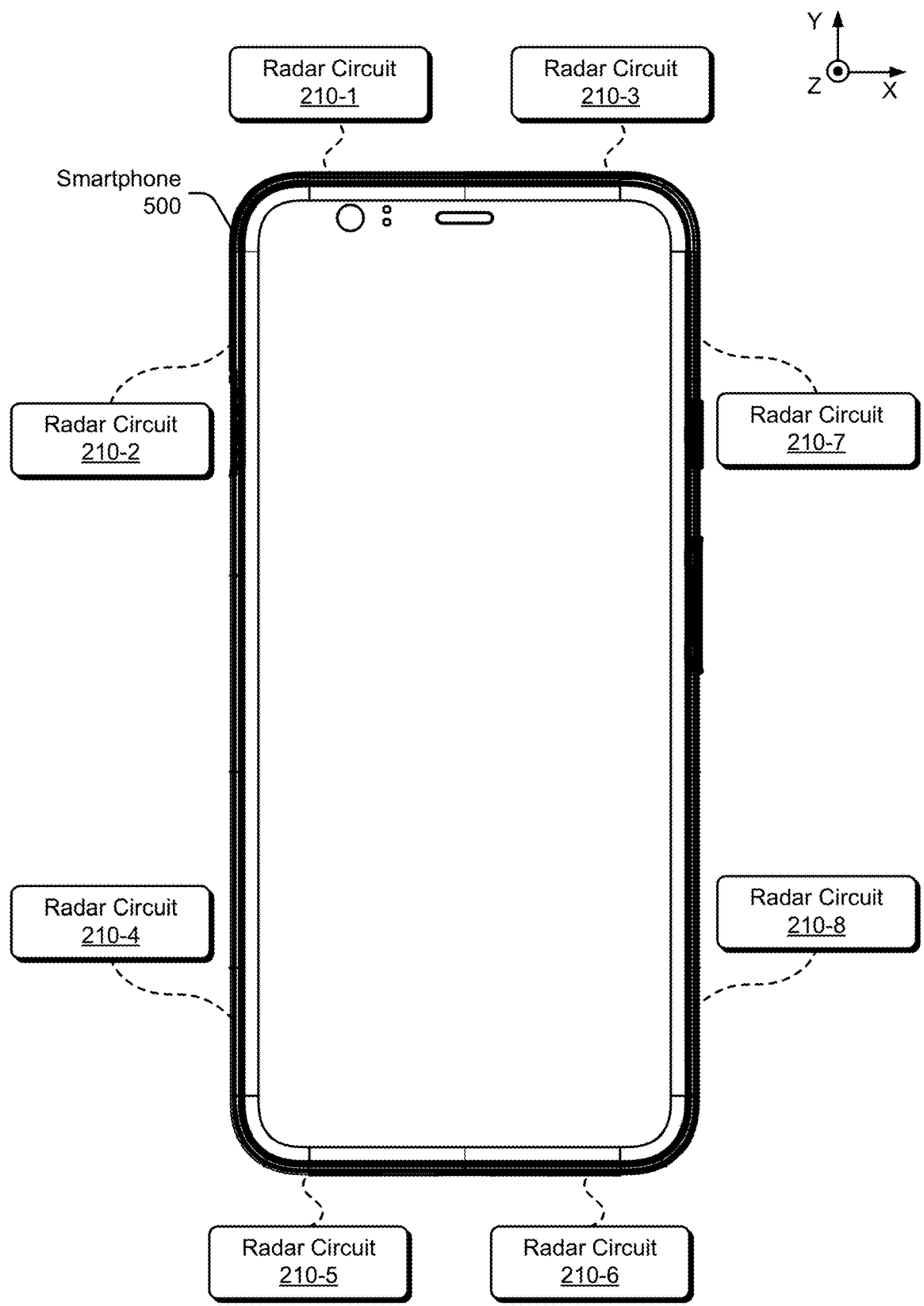
FIG. 5 illustrates example positions of a multi-radar system's radar circuits on a smartphone.

FIG. 5 illustrates example positions of the multi-radar system 102's radar circuits 210 on a smartphone 500. In the depicted configuration, the smartphone 500 includes radar circuits 210-1 to 210-8. In some implementations, the radar circuits 210-1 to 210-8 are positioned within or under an exterior housing of the smartphone 500, which can be substantially transparent to radar signals (e.g., minimally attenuate radar signals).

The radar circuits 210-1 to 210-8 are positioned around the smartphone 500 such that a portion of each radar circuit 210's antenna pattern overlaps at least one other radar circuit 210's antenna pattern. In this way, an object can be detected in the overlapping antenna patterns of at least two of the radar circuits 210-1 to 210-8 at various locations around the smartphone 500.

The one or more antennas 212 of each radar circuit 210 can face up along the Y axis towards an upper side of the smartphone 500, face left along the X axis towards a left side of the smartphone 500, face down along the Y axis towards a bottom side of the smartphone 500, or face right along the X axis towards a right side of the smartphone 500. For example, the antennas 212 of the radar circuits 210-1 and 210-3 can face up along the Y axis, the antennas 212 of the radar circuits 210-2 and 210-4 can face left along the X axis, the antennas 212 of the radar circuits 210-5 and 210-6 can face down along the Y axis, and the antennas 212 of the radar circuits 210-7 and 210-8 can face right along the X axis. In other implementations, the antennas 212 of one or more of the radar circuits 210-1 to 210-8 can face up out of the page along the Z axis towards a front face of the smartphone 500 or face down into the page along the Z axis towards a back side of the smartphone 500.

Although the antennas 212 of the radar circuits 210-1 to 210-8 can face a particular side of the smartphone 500, the antenna patterns of these antennas 212 can encompass a volume of space above the front face of the smartphone 500 and/or another volume of space behind the backside of the smartphone 500. In this way, the radar circuits 210-1 to 210-8 can detect a user interacting with the smartphone 500.

Some positions within or around the smartphone 500 can be better for detecting certain types of gestures performed by a user. In particular, these positions can increase a radar circuit 210's probability of detecting the user by increasing the radar circuit 210's signal-to-noise ratio. For example, some positions can increase the overlap between a radar circuit 210's antenna pattern and a region of interest in which the user is likely to perform gestures or interact with the smartphone 500. The positions of the radar circuits 210-5 and 210-6, for instance, can be better for detecting gestures by placing the radar circuits 210-5 and 210-6 closer to the user as the user holds the smartphone 500 in the depicted portrait orientation. Alternatively, the radar circuits 210-2 and 210-4 or the radar circuits 210-7 and 210-8 can be better positioned for detecting gestures if the user holds the smartphone 500 in a landscape orientation (not shown).

In some implementations, the radar circuits 210-1 to 210-8 have multiple antennas 212 that form an antenna array, such as multiple transmit antennas 420 or multiple receive antennas 422. Consider an example in which the radar circuits 210-1 to 210-8 each include at least two receive antennas 422-1 and 422-2, which form a linear antenna array. Orientations of these linear antenna arrays can vary to enable the multi-radar system 102 to determine two-dimensional angular information associated with an object. In particular, orientations of some linear antenna arrays can differ by approximately 90 degrees. For example, the receive antennas 422-1 and 422-2 of the radar circuit 210-1 can be aligned along the X axis to enable the multi-radar system 102 to measure azimuth angles of objects and the receive antennas 422-1 and 422-2 of the radar circuit 210-2 can be aligned along the Y axis to enable the multi-radar system 102 to measure elevation angles of objects.

Although the smartphone 500 of FIG. 5 is shown to include eight radar circuits 210-1 to 210-8, other implementations of the smartphone 500 can have fewer radar circuits 210. For example, the smartphone 500 can include two radar circuits 210, such as radar circuits 210-1 and 210-2. In some cases, the two radar circuits 210 are oriented along different axes to enable two-dimensional angular information to be determined. The radar circuits 210-1 to 210-8 can operate according to different operational states, which are further described with respect to FIG. 6.

Optimizing Operation of a Multi-Radar System

Figure 6:
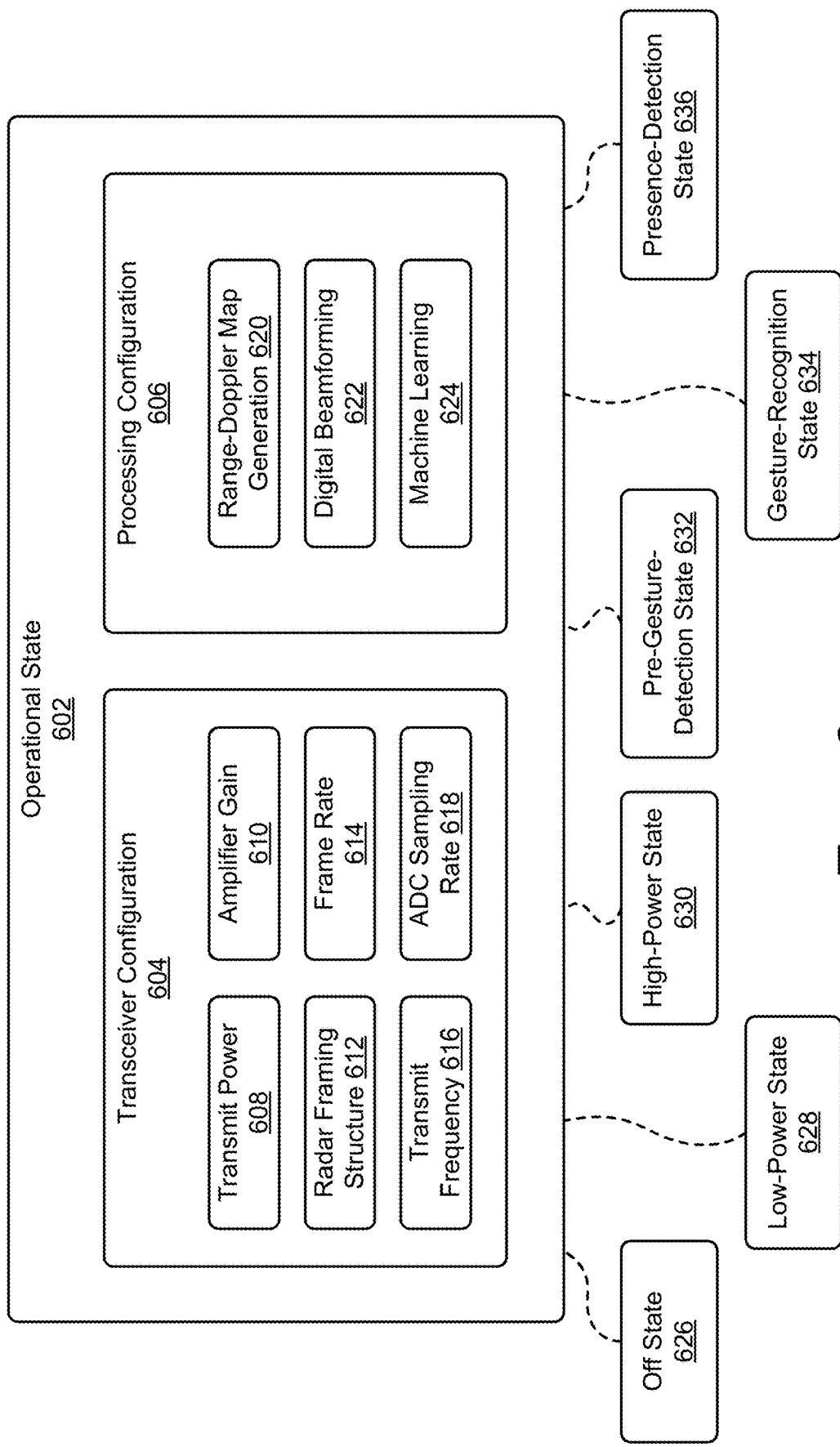
FIG. 6 illustrates example states of a radar circuit.

FIG. 6 illustrates an example operational state 602 of a radar circuit 210. The operational state 602 can be associated with a transceiver configuration 604 and/or a processing configuration 606. The transceiver configuration 604 represents a configuration of the radar circuit 210's transceiver 214, which can affect characteristics of the radar transmit signal 306 and the radar receive signal 308. For example, the transceiver configuration 604 can specify a particular transmit power 608 or amplifier gain 610. In some cases, the transmit power 608 can vary based on a range or distance that the radar circuit 210 is monitoring. If the user 302 is farther from the user device 104, for example, a higher transmit power 608 can be used to detect the user 302. Alternatively, if the user 302 is closer to the user device 104, a lower transmit power 608 can be used to conserve power. The amplifier gain 610 can enable a particular transmit power 608 by specifying the gain of the power amplifier 408 of FIG. 4. In other cases, the amplifier gain 610 can specify a gain of the low-noise amplifier 412 of FIG. 4 or a gain of a variable gain amplifier within the transceiver 214 (not shown in FIG. 4). Although increasing the amplifier gain 610 can improve sensitivity of the multi-radar system 102, it can also increase a likelihood of signal clipping or saturation. This signal clipping can make it challenging for the multi-radar system 102 to accurately detect objects with large radar cross sections or objects at close ranges.

Additionally or alternatively, the transceiver configuration 604 can specify a particular radar framing structure 612 (e.g., the framing structure 312 of FIG. 3-2) and/or a frame rate 614 of frames within the radar framing structure 612. As described with respect to FIG. 3-2, the radar framing structure 612 specifies scheduling and signal characteristics associated with the transmission and reception of the radar signals. In general, the radar framing structure 612 is selected to enable the appropriate radar data to be collected for the radar-based application 206. The radar framing structure 612 can be customized to facilitate collection of different types of radar data for different applications (e.g., presence detection, feature recognition, or gesture recognition). The frame rate 614 represents the rate at which particular frames (e.g., the main frames 314, the feature frames 316, or the radar frames 322) are scheduled within the radar framing structure 612.

The transceiver configuration 604 can optionally specify a particular transmit frequency 616 or an analog-to-digital converter (ADC) sampling rate 618. The transmit frequency 616 can include a center frequency and/or a bandwidth of the radar transmit signal 306. Decreasing the transmit frequency 616 can reduce propagation loss and enable the radar circuit 210 to detect objects at farther ranges. In contrast, increasing the transmit frequency 616 can improve Doppler sensitivity of the radar circuit 210. Increasing the ADC sampling rate 618 of the analog-to-digital converter 418 (of FIG. 4) can increase the maximum detectable range of the radar circuit 210 at the cost of increasing power consumption. Other transceiver configurations 604 not shown can include a filter cut-off frequency, which can specify a passband of the filter 416 (of FIG. 4).

The processing configuration 606 represents a configuration of the radar circuit 210's system processor 216 and the types of functions or operations it performs to analyze the radar receive signal 308. Example processing configurations 606 can include range-Doppler map generation 620, digital beamforming 622, and/or machine learning 624. For some radar-based applications 206, such as presence detection, the range-Doppler map generation 620 can be used to detect an object and measure a range or range rate of the object. For other radar-based applications 206 that utilize angular information about the object, the processing configuration 606 can include digital beamforming 622 to measure the angular position of the object. The machine learning 624 can be used to perform gesture recognition, for instance. Various processing configurations 606 can utilize different amounts of memory or computational power, which in turn affects power consumption of the multi-radar system 102.

Example operational states 602 include an off state 626, a low-power state 628, a high-power state 630, a pre-gesture-detection state 632, and a gesture-recognition state 634. These operational states are further described with respect to FIGS. 8-1 to 8-4. The optimization controller 220, which may determine or manage the operational states 602, is further described with respect to FIGS. 7-1 and 7-2.

Figures 1, 7:
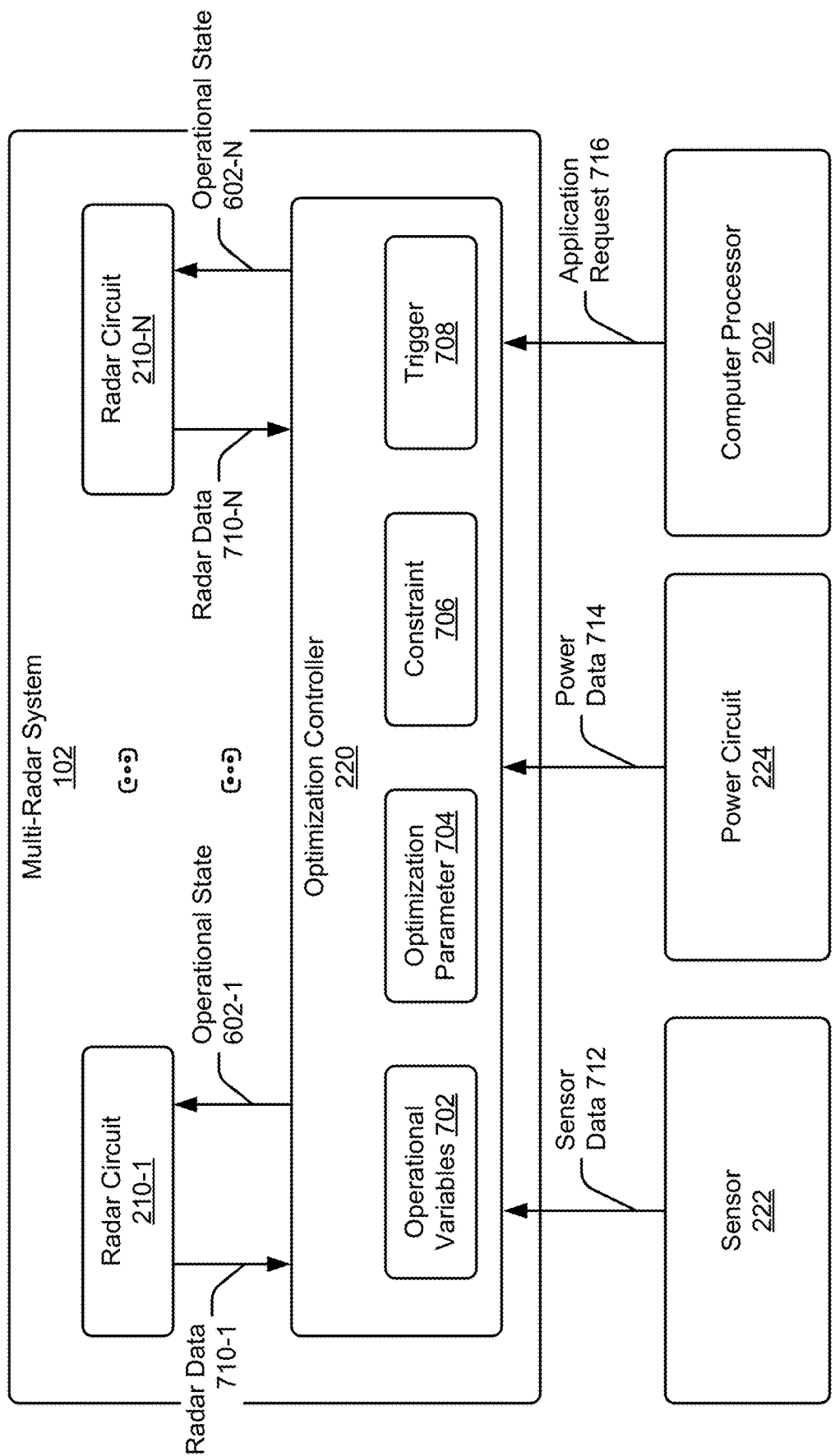
Figures 2, 7:
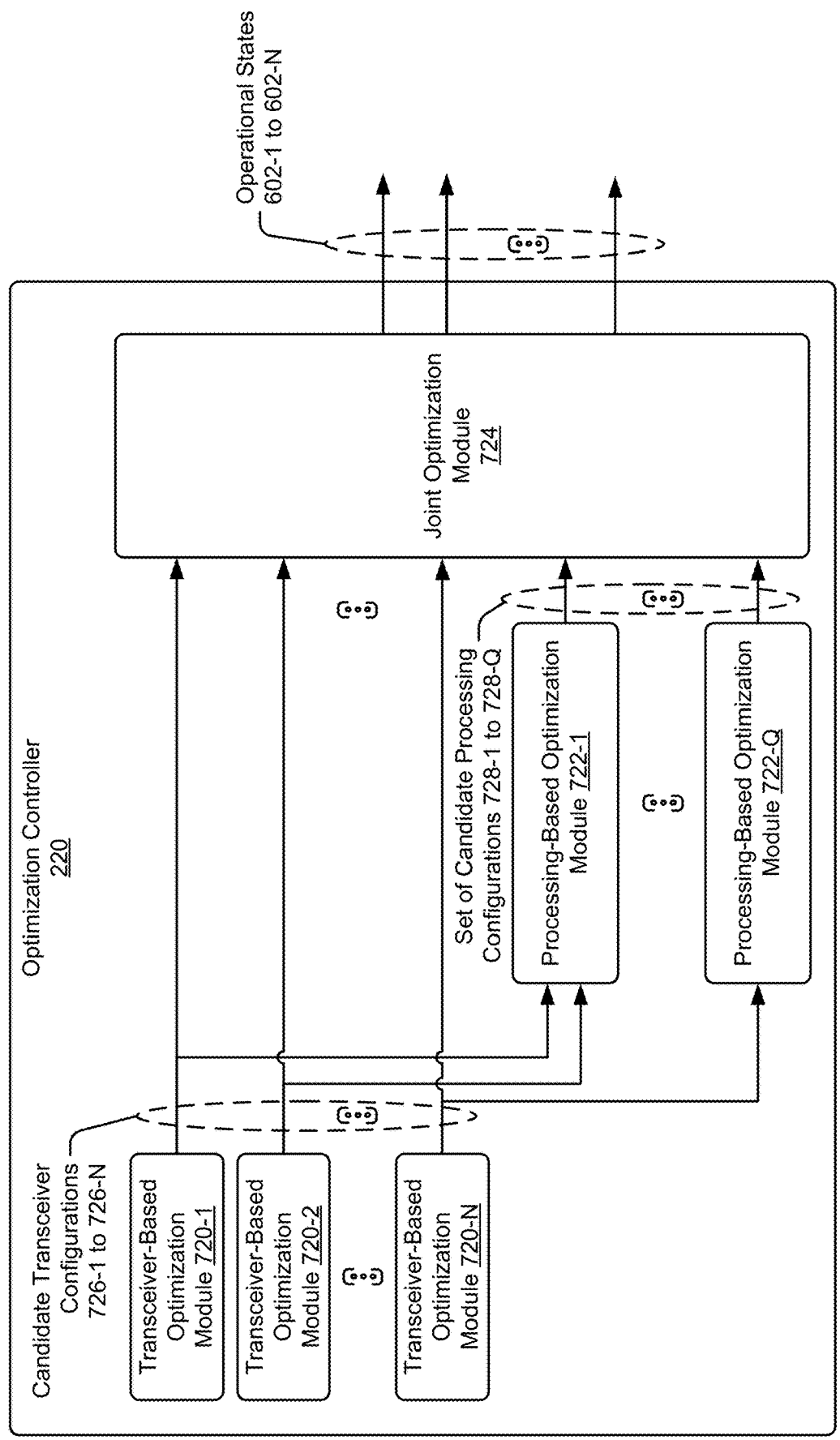

FIG. 7-1 illustrates the optimization controller 220 as part of the multi-radar system 102. In the depicted configuration, the optimization controller 220 is coupled to the radar circuits 210-1 to 210-N of the multi-radar system 102. The optimization controller 220 can also be coupled to the sensor 222, the power circuit 224, and/or the computer processor 202 of the user device 104.

During operation, the optimization controller 220 considers one or more operational variables 702 associated with the radar circuits 210-1 to 210-N, one or more optimization parameters 704, and one or more constraints 706 to determine the operational states 602-1 to 602-N for the respective radar circuits 210-1 to 210-N. The operational variables 702 describe characteristics of the radar circuits 210-1 to 210-N, such as antenna patterns, noise figures, power consumption, and constant false-alarm rate (CFAR) thresholds. Other operational variables 702 can be related to the user device 104 or the environment, such as an orientation of the user device 104, battery capacity of the user device 104, or weather conditions (e.g., precipitation). Some operational variables 702 can be fixed, such as the antenna patterns, while others can vary over time, such as the orientation of the user device 104 or the weather.

The optimization parameter 704 represents a parameter that the optimization controller 220 can improve by tailoring the operational states 602-1 to 602-N of the radar circuits 210-1 to 210-N. Example optimization parameters 704 include signal-to-noise ratio performance (e.g., accuracy), angular estimation performance (e.g., accuracy of azimuth or elevation measurements), and an F-score (e.g., recall and precision). Other example optimization parameters 704 can include range resolution, Doppler resolution, coverage volume (e.g., a detectable range or angular field-of-view), responsiveness, or some combination thereof.

The constraint 706 represents a parameter that can impact the ability to improve the optimization parameter 704. The optimization controller 220, for example, evaluates a cost function that determines operational states 602-1 to 602-N that maximize the optimization parameter 704 based on the given constraint 706. Example constraints 706 can include available power (e.g., device battery capacity), the presence or amount of signal clipping (e.g., saturation), power regulations (e.g., a specific-absorption rate (SAR) or a maximum permissible exposure (MPE)), or the presence or amount of interference from other radar circuits 210 or other components within the user device 104 (e.g., a speaker or a wireless communication transceiver).

The optimization controller 220 can also monitor one or more triggers 708, which cause the optimization controller 220 to re-evaluate the operational states 602-1 to 602-N of the radar circuits 210-1 to 210-N. A trigger 708 can be activated based on information provided by any of the radar circuits 210-1 to 210-N, or based on information provided by other components within the user device 104, such as the sensor 222, the power circuit 224, or the computer processor 202. Example triggers 708 can include one of the radar circuits 210-1 to 210-N determining that the user 302 is no longer present, determining that the user 302 is present but outside a specified range, determining that the user 302 is approaching the user device 104, or determining that the user is preparing to perform a gesture or has started performing a gesture. Other example triggers 708 can include the sensor 222 detecting movement or rotation of the user device 104, the power circuit 224 determining that the available power for operating the multi-radar system 102 has decreased below a predetermined threshold, the power circuit 224 causing the user device 104 to operate according to a low-power mode to conserve power, or the computer processor 202 activating a different radar-based application 206. An example trigger 708 can also include an expiration of a timer.

During operation, the optimization controller 220 can reference information that is stored within its computer-readable storage medium to determine the operational variables 702, the optimization parameter 704, and the constraint 706. Additionally or alternatively, the optimization controller 220 can accept information from the radar circuits 210-1 to 210-N, the sensor 222, the power circuit 224, or the computer processor 202 to determine the operational variables 702, the optimization parameter 704, and/or the constraint 706.

For example, the radar circuits 210-1 to 210-N provide radar data 710-1 to 710-N to the optimization controller 220. The radar data 710-1 to 710-N can include information about whether or not an object (e.g., the user 302) is present, position or motion information about a detected object (e.g., range, azimuth, elevation, range rate, or velocity), a type of gesture performed by a detected user 302, an alert regarding a potential collision, measured vital signs of the user 302, and so forth. In some cases, the radar data 710-1 to 710-N can include raw samples of the radar receive signals 308-1 to 308-M (e.g., samples of the digital beat signals 428-1 to 428-M of FIG. 3) or processed data (e.g., range-Doppler maps, range-azimuth-elevation maps). In some cases, the radar data 710-1 to 710-N can additionally include the operational variables 702 associated with the respective radar circuits 210-1 to 210-N.

Additionally or alternatively, the optimization controller 220 accepts sensor data 712 from the sensor 222, power data 714 from the power circuit 224, and an application request 716 from the computer processor 202. The sensor data 712 can include information such as an orientation of the user device 104 (e.g., a portrait orientation or a landscape orientation), whether or not the user device 104 is moving, or other environmental conditions. The power data 714 can include information about an amount of available power for operating the multi-radar system 102, remaining power stored by a battery of the power circuit 224, a power mode of the user device 104 (e.g., a low-power mode or a normal power mode), or whether or not the user device 104 is being powered by an external power source. The application request 716 can include radar performance parameters associated with a radar-based application 206 executed by the computer processor 202. These parameters can include the types of gestures that can be used to interact with the radar-based application 206, a level of accuracy or responsiveness requested by the radar-based application 206, or combinations thereof.

The optimization controller 220 monitors the radar data 710-1 to 710-N, the sensor data 712, the power data 714, and the application request 716 to detect a trigger event. The trigger event occurs if the operating environment changes. By monitoring this information, the optimization controller 220 can detect a change in the operating environment (e.g., detect the trigger 708). Responsive to detecting this change, the optimization controller 220 can analyze the operational variables 702, the one or more optimization parameters 704, and the one or more constraints 706 to determine individual operational states 602 of the radar circuits 210-1 to 210-N. The optimization controller 220 provides the operational states 602-1 to 602-N to the radar circuits 210-1 to 210-N. The process of determining the operational states 602-1 to 602-N based on the operational variables 702, the optimization parameter 704, and the constraint 706 is further described with respect to FIG. 7-2.

FIG. 7-2 illustrates an example scheme implemented by the optimization controller 220 for optimizing operation of the multi-radar system 102. In the depicted configuration, the optimization controller 220 implements transceiver-based optimization modules 720-1 to 720-N, processing-based optimization modules 722-1 to 722-Q, and a joint optimization module 724. The quantity of processing-based optimization modules 722 (Q) can be similar to or different than the quantity of transceiver-based optimization modules 720 (N).

The transceiver-based optimization modules 720-1 to 720-N are associated with respective radar circuits 210-1 to 210-N. Each transceiver-based optimization module 720 selects a candidate transceiver configuration 726 for its corresponding radar circuit 210 based on the operational variables 702 associated with the radar circuit 210, one or more optimization parameters 704, and one or more constraints 706. For example, the transceiver-based optimization module 720-1 executes a cost function to determine a candidate transceiver configuration 726-1 that maximizes signal-to-noise ratio performance for the corresponding radar circuit 210-1 given the amount of available power. The candidate transceiver configurations 726-1 to 726-N are provided to the processing-based optimization modules 722-1 to 722-Q and the joint optimization module 724.

The processing-based optimization modules 722-1 to 722-Q are associated with different sets of the radar circuits 210-1 to 210-N. Each processing-based optimization module 722 considers a set of the radar circuits 210-1 to 210-N to determine candidate processing configurations 728 for each radar circuit 210 within the set. For example, the processing-based optimization modules 722-1 can consider the information requested by an active radar-based application 206 to determine the processing configuration 606 that maximizes the F-score given the candidate transceiver configurations 726-1 and 726-2 of radar circuits 210-1 and 210-2. The processing-based optimization modules 722-1 to 722-Q provide sets of the candidate processing configurations 728-1 to 728-Q to the joint optimization module 724.

The joint optimization module 724 analyzes the candidate transceiver configurations 726-1 to 726-N and the sets of candidate processing configurations 728-1 to 728-Q to determine the operational states 602-1 to 602-N. Optionally, the joint optimization module 724 can cause the transceiver-based optimization modules 720-1 to 720-N and the processing-based optimization modules 722-1 to 722-Q to repeat the above process to further optimize the operational states 602-1 to 602-N with a different set of operational variables 702, optimization parameters 704, or constraints 706. A variety of different situations can cause the optimization controller 220 to adjust the operational states 602-1 to 602-N of the radar circuits 210-1 to 210-N, examples of which are further described with respect to FIGS. 8-1 to 8-4.

Figures 1, 8:
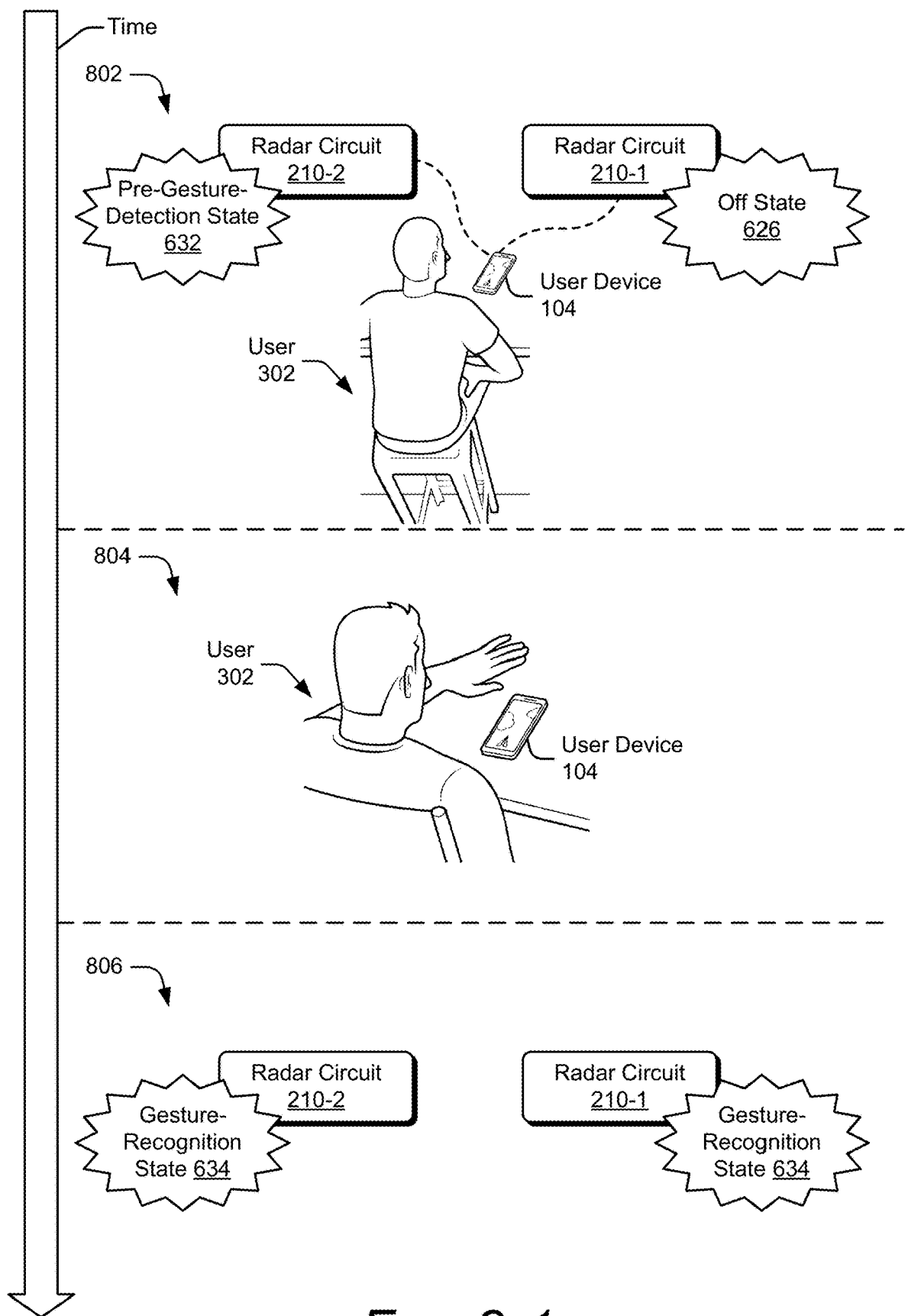
Figures 2, 8:
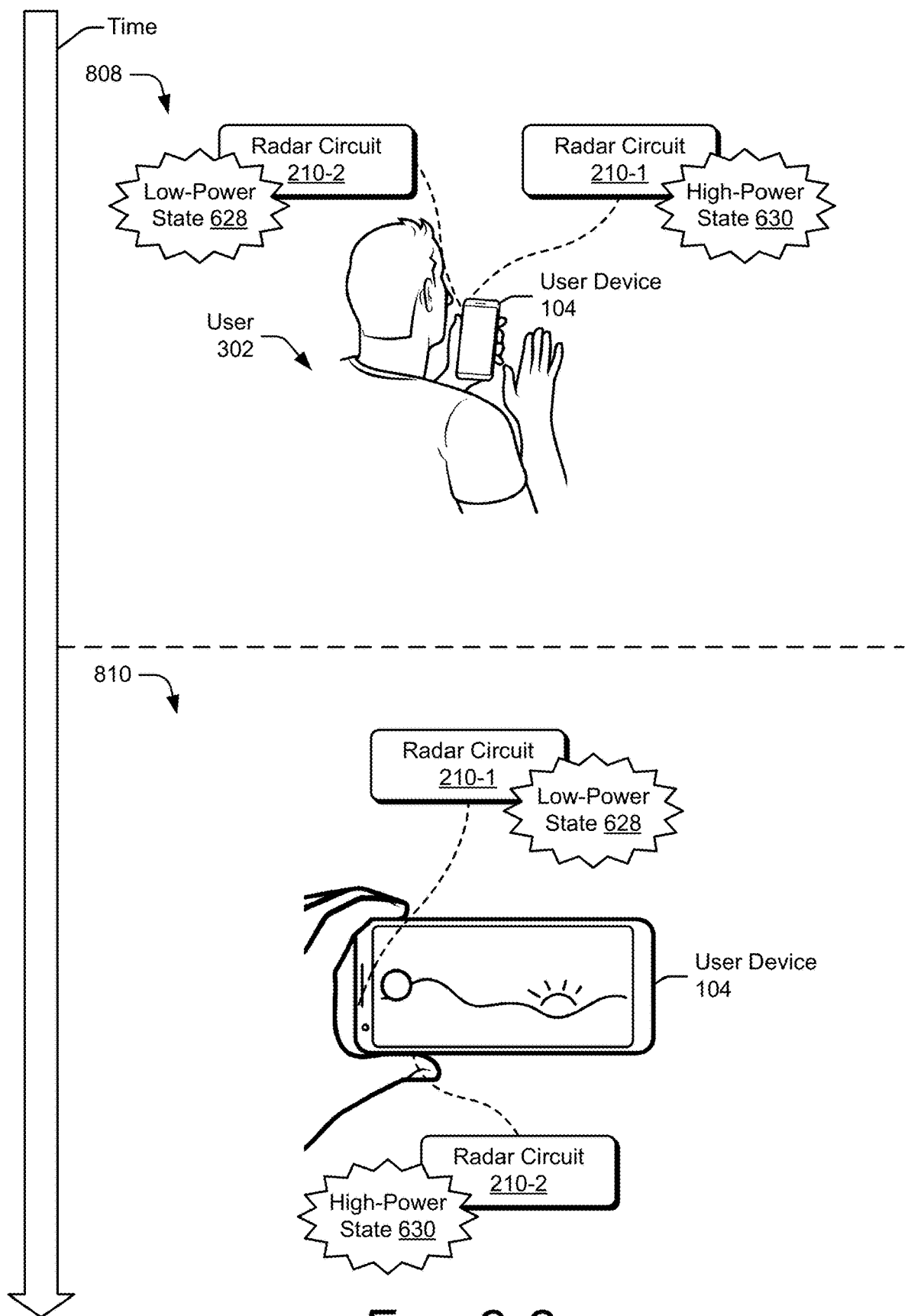
Figures 3, 8:
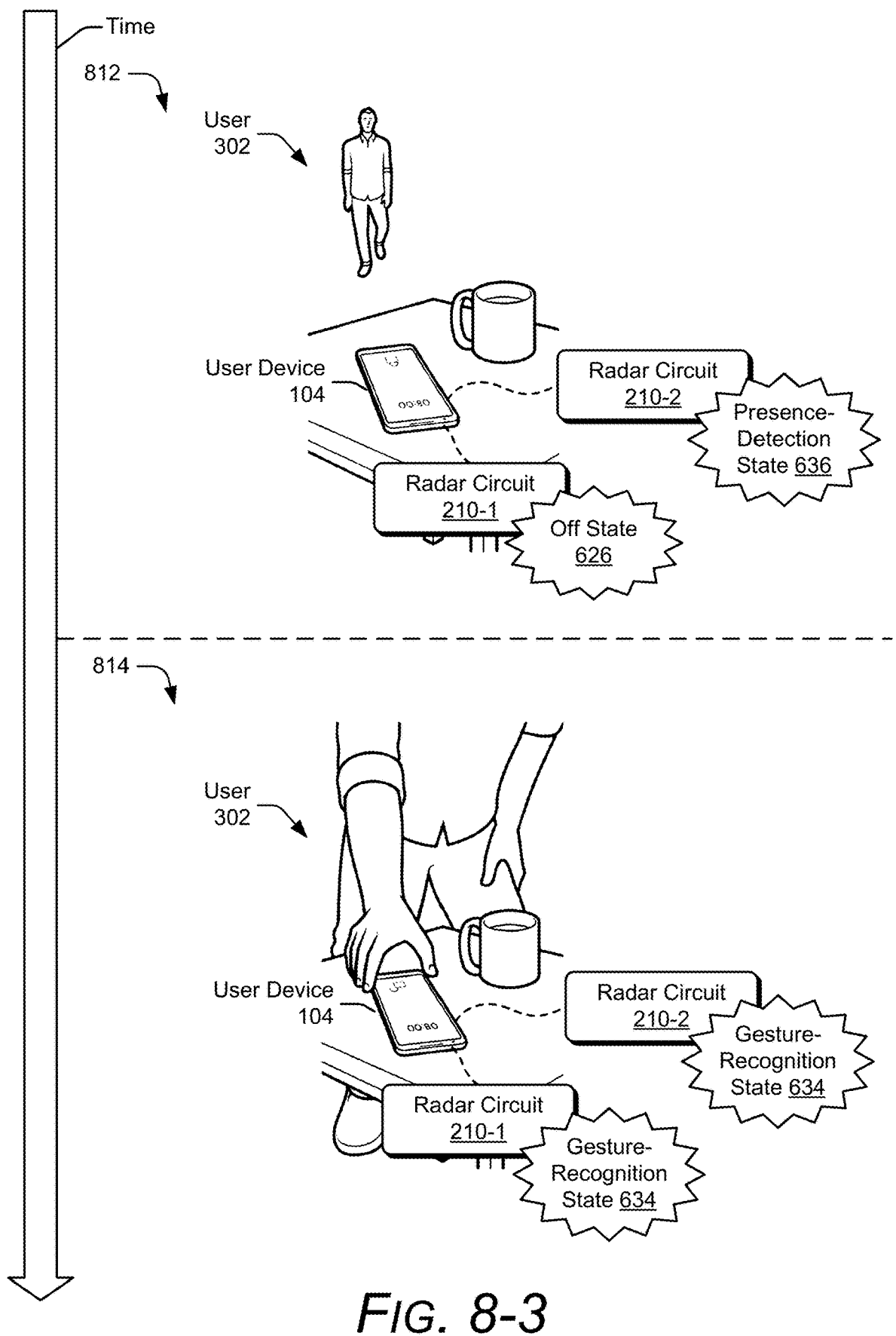
Figures 4, 8:
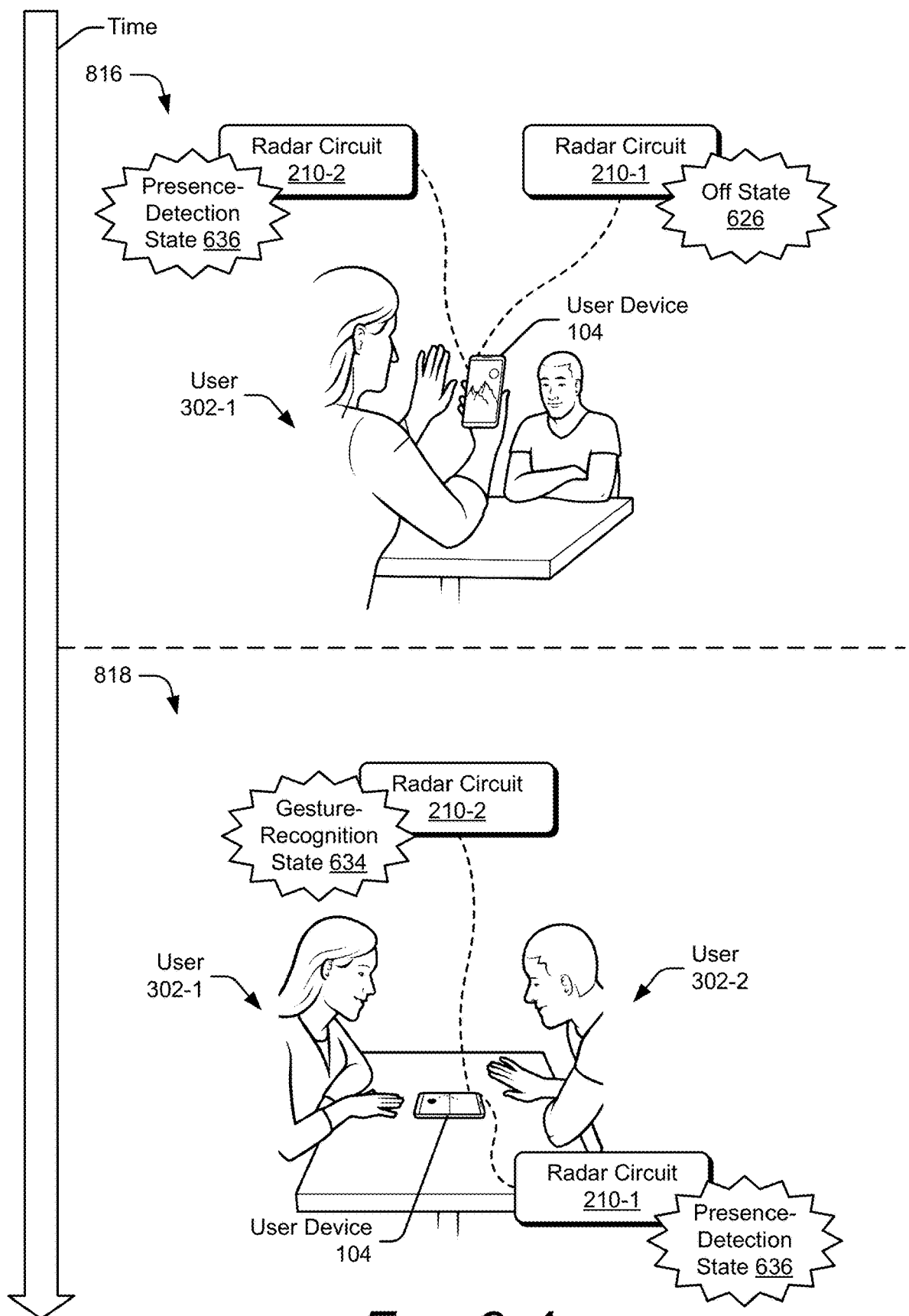

FIG. 8-1 illustrates an example situation in which the optimization controller 220 optimizes operation of the multi-radar system 102 based a detected change associated with the user 302. In this scenario, the user device 104 includes the radar circuits 210-1 and 210-2. At 802, the optimization controller 220 initializes the operational states 602-1 and 602-2 of the radar circuits 210-1 and 210-2 to minimize power consumption of the multi-radar system 102. In particular, the optimization controller 220 causes the radar circuit 210-1 to operate according to the off state 626 (of FIG. 6) and causes the radar circuit 210-2 to operate according to the pre-gesture-detection state 632 (of FIG. 6). In the off state 626, the radar circuit 210-1 is powered down and does not transmit or receive radar signals. In the pre-gesture-detection state 632, the radar circuit 210-2 transmits and receives radar signals while conserving power. For example, the radar circuit 210-2 can operate with a frame rate of 50 Hz for the burst-mode feature frames 320 and with an ADC sampling rate 618 of one mega-sample per second (Msps). This enables the radar circuit 210-2 to detect an intension of the user 302 to perform a gesture (e.g., detect the user 302 positioning themselves to perform a gesture or detect the start of the gesture).

At 804, the user 302 performs a gesture, which is detected by the radar circuit 210-2 and communicated to the optimization controller 220. This triggers the optimization controller 220 to adjust the operational states 602-1 and 602-2 of the radar circuits 210-1 and 210-2. At 806, the optimization controller 220 causes both the radar circuits 210-1 and 210-2 to operate according to the gesture-recognition state 634. The gesture-recognition state 634 enables the radar circuits 210-1 to 210-2 to jointly detect the gesture performed by the user 302. In comparison to the pre-gesture-detection state 632, the gesture-recognition state 634 can decrease the frame rate to 25 Hz.

FIG. 8-2 illustrates an example situation in which the optimization controller 220 optimizes operation of the multi-radar system 102 based on detected change in an orientation of the user device 104. In this scenario, the user device 104 includes the radar circuits 210-1 and 210-2. At 808, the optimization controller 220 initializes the operational states 602-1 and 602-2 of the radar circuits 210-1 and 210-2 based on a portrait orientation of the user device 104. In this case, the optimization controller 220 determines operational states 602-1 and 602-2 that improve the signal-to-noise ratio performance while limiting power consumption.

Consider a situation in which the radar circuit 210-1 realizes a lower signal-to-noise ratio than the radar circuit 210-2 for detecting gestures near a bottom portion of the user device 104. This can be due to the orientation of the radar circuit 210-1 antenna 212 and the antenna pattern of the radar circuit 210-1. The optimization controller 220 improves, at 808, the signal-to-noise ratio performance of the radar circuit 210-1 by causing the radar circuit 210-1 to operate according to the high-power state 630 (e.g., full-power state). To compensate for the increase in power consumption caused by operating the radar circuit 210-1 in the high-power state 630, the optimization controller 220 causes the radar circuit 210-2 to operate according to the low-power state 628. In the high-power state 630, the radar circuit 210-1 has a higher transmit power 608 than the radar circuit 210-2 in the low-power state 628. Additionally, the radar circuit 210-1 operates with a larger quantity of chirps 310 per a burst-mode feature frame 320, a higher frame rate 614 of burst-mode feature frames 320, and a higher ADC higher sampling rate 618 relative to the radar circuit 210-2. This causes the radar circuit 210-1 to consume more power than the radar circuit 210-2.

At 810, the user 302 changes the orientation of the user device 104 to a landscape orientation. The optimization controller 220 adjusts the operational states 602-1 and 602-2 of the radar circuits 210-1 and 210-2 based on the landscape orientation. In this example, the optimization controller 220 causes the radar circuit 210-1 to operate according to the low-power state 628 and causes the radar circuit 210-2 to operate according to the high-power state 630. Optionally, the optimization controller 220 can cause the radar circuit 210-1 or the radar circuit 210-2 to operate in the off state 626 if the sensor 222 or either radar circuit 210-1 or 210-2 determines that the user 302's hand is obstructing the radar circuit 210-1 or 210-2.

In an alternative scenario, the optimization controller 220 can determine operational states 602-1 and 602-2 of the radar circuits 210-1 and 210-2 to improve angular estimation and limit power consumption. In this case, the radar circuit 210-1 can be better positioned in the portrait mode to capture angular information associated with a swipe gesture performed by the user 302. Therefore, in the portrait mode, the optimization controller 220 can improve angular estimation by causing the radar circuit 210-1 to operate at the high-power state 630 and the radar circuit 210-2 to operate at the low-power state 628 to conserve power. By operating the radar circuit 210-1 in the high-power state, the accuracy of the radar circuit 210-1 for angular estimation can be improved relative to the accuracy in the low-power state 628. In the landscape mode, the radar circuit 210-2 can be better positioned to capture angular information for the swipe gesture. As such, the optimization controller 220 can improve angular estimation by causing the radar circuit 210-2 to operate at the high-power state 630 and the radar circuit 210-1 to operate at the low-power state 628 to conserve power.

FIG. 8-3 illustrates an example situation in which the optimization controller 220 optimizes operation of the multi-radar system 102 based on a detected presence of the user 302. At 812, the user 302 is outside a detectable range of the multi-radar system 102. The optimization controller 220 determines the operational states 602-1 and 602-2 of the radar circuits 210-1 and 210-2 to minimize power consumption of the multi-radar system 102. Considering that the radar circuit 210-2 has sufficient signal-to-noise ratio performance for detecting the user 302 approaching the user device 104 from one or more directions, the optimization controller 220 causes the radar circuit 210-1 to transition to the off state 626 to conserve power. The optimization controller 220 also causes the radar circuit 210-2 to operate in the presence-detection state 636, which enables the radar circuit 210-2 to detect the user 302 once the user 302 is within the detectable range associated with the radar circuit 210-2.

At 814, the radar circuit 210-2 detects the user 302. In response, the optimization controller 220 causes the radar circuits 210-1 and 210-2 to operate according to the gesture-recognition state 634 to enable the radar circuits 210-1 and 210-2 to detect a gesture performed by the user 302, such as a reach gesture. In comparison, the gesture-recognition state 634 can increase the quantity of chirps 310 per burst-mode feature frame 320 within the radar framing structure 612 compared to the presence-detection state 636.

FIG. 8-4 illustrates an example situation in which the optimization controller 220 optimizes operation of the multi-radar system 102 based on a detected presence of multiple users 302. At 816, user 302-1 interacts with the user device 104. The optimization controller 220 causes the radar circuit 210-1 to operate according to the off state 626 to conserve power and causes the radar circuit 210-2 to operate according to the presence-detection state 636 to enable detection of additional users.

At 818, the radar circuit 210-2 detects the presence of another user 302-2. The optimization controller 220 causes the radar circuit 210-1 to operate according to the presence-detection state 636 and causes the radar circuit 210-2 to operate according to the gesture-recognition state 634. In this manner, the radar circuit 210-1 can detect when either of the users 302-1 to 302-2 leave a detectable range of the multi-radar system 102 and the radar circuit 210-2 can detect gestures performed by the users 302-1 and 302-2. To conserve power, the gesture-recognition state 634 can have a slower ADC sampling rate 618 relative to the presence-detection state 636. In this example, different radar circuits 210 are configured to enable different types of analysis, such as presence detection and gesture recognition. In an alternative implementation, either or both radar circuits 210-1 and 210-2 can operate in another operational state 602 that supports both presence detection and gesture recognition.

Example Method

FIG. 9 depicts an example method 900 performed by a multi-radar system. Method 900 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-6 of FIG. 1, and entities detailed in FIG. 2, 4, 7-1 or 7-2, reference to which is made for example only. The techniques are not limited to performance by one entity or multiple entities operating on one device.

At 902, a first radar circuit of a multi-radar system's two or more radar circuits is in (e.g., operates according to) a first operational state. For example, the radar circuit 210-1 of the multi-radar system 102 operates according to a first operational state 602-1. The first operational state 602-1 can be the off state 626 (as shown in FIG. 8-1, 8-3, or 8-4 at 802, 812, and 816, respectively), the low-power state 628, the high-power state 630 (as shown in FIG. 8-2 at 808), the pre-gesture-detection state 632, the gesture-recognition state 634, or the presence-detection state 636 (as shown in FIG. 8-3 at 812). In particular, the first operational state 602-1 specifies a particular transceiver configuration 604 and a particular processing configuration 606 for the radar circuit 210-1.

At 904, a second radar circuit of the multi-radar system operates is in (e.g., operates according to) a second operational state. For example, the radar circuit 210-2 of the multi-radar system 102 operates according to a second operational state 602-2. The second operational state 602-2 can be the off state 626, the low-power state 628 (as shown in FIG. 8-2 at 808), the high-power state 630, the pre-gesture-detection state 632 (as shown in FIG. 8-1 at 802), the gesture-recognition state 634, or the presence-detection state 636 (as shown in FIG. 8-3 at 812 and FIG. 8-4 at 816). In particular, the second operational state 602-2 specifies a particular transceiver configuration 604 and a particular processing configuration 606 for the radar circuit 210-2. The second operational state 602-2 of the second radar circuit 210-2 can be similar to or different from the first operational state 602-1 of the first radar circuit 210-1.

At 906, a trigger event is detected. The trigger event represents a change in an operating environment of the multi-radar system. For example, the optimization controller 220 detects a trigger event associated with a change in the multi-radar system 102's operating environment. Example trigger events include a detected change in a position of the user 302, a detected change in the quantity of users 302 present, a detected change in an orientation of the user device 104, or a detected change in the amount of power available within the user device 104. Other example trigger events are further described with respect to FIG. 6.

At 908, operation of at least one of the first radar circuit or the second radar circuit is selectively altered responsive to detection of the trigger event. For example, the optimization controller 220 selectively alters operation of the radar circuit 210-1 or the radar circuit 210-2 responsive to (or based on) detection of the trigger event. The adjusting or altering of the operation may include one of causing (or directing) the first radar circuit to operate according to a third operational state that is different than the first operational state or causing (or directing) the second radar circuit to operate according to a fourth operational state that is different than the second operational state. Alternatively or additionally, adjusting or altering a respective operation state 602 of a radar circuit 210 may include transitioning or configuring the radar circuit 210 to operate in an operational state 602 that is different from a current operational state of the radar circuit 210. Examples third operational states and the fourth operational states are described in FIG. 8-1 at 806, FIG. 8-2 at 810, FIG. 8-3 at 814, and FIG. 8-4 at 818.

The optimization controller 220 can adjust the operational states 602-1 and 602-2 based on changes to an optimization parameter 704 or a constraint 706, which are used to determine the operational states 602-1 and 602-2. In this way, the optimization controller 220 can optimize performance of the multi-radar system 102 in the context of the given constraints 706, such as available power.

Example Computing System

Figure 10:
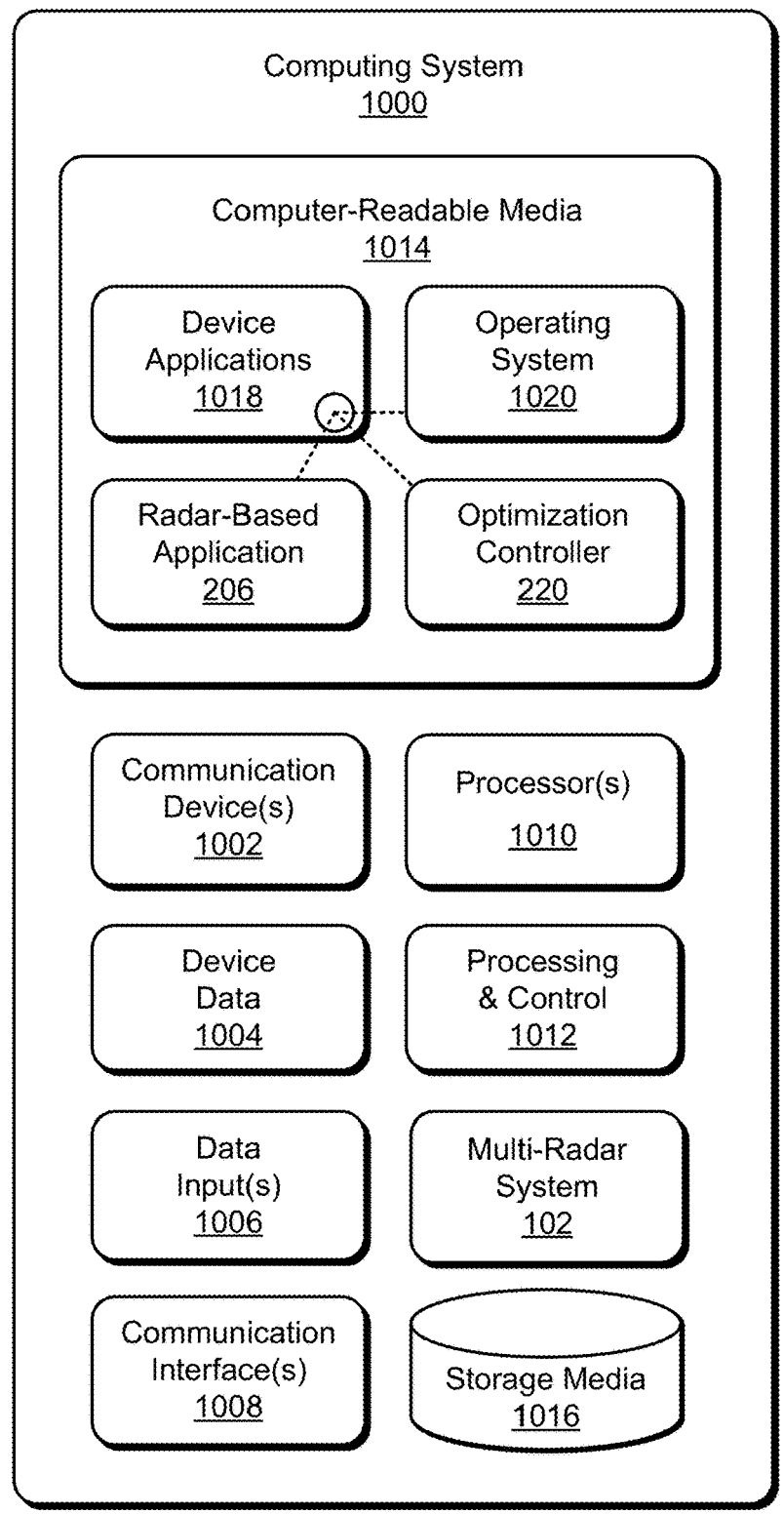
FIG. 10 illustrates an example computing system embodying, or in which techniques may be implemented that enable use of, a multi-radar system.

FIG. 10 illustrates various components of an example computing system 1000 that can be implemented as any type of client, server, and/or computing device as described with reference to the previous FIG. 2 to optimize operation of a multi-radar system 102.

The computing system 1000 includes communication devices 1002 that enable wired and/or wireless communication of device data 1004 (e.g., received data, data that is being received, data scheduled for broadcast, or data packets of the data). The computing system 1000 also includes one or more multi-radar systems 102. The device data 1004 or other device content can include configuration settings of the device, media content stored on the device, and/or information associated with a user 302 of the device. Media content stored on the computing system 1000 can include any type of audio, video, and/or image data. The computing system 1000 includes one or more data inputs 1006 via which any type of data, media content, and/or inputs can be received, such as human utterances, the radar-based application 206, user-selectable inputs (explicit or implicit), messages, music, television media content, recorded video content, and any other type of audio, video, and/or image data received from any content and/or data source.

The computing system 1000 also includes communication interfaces 1008, which can be implemented as any one or more of a serial and/or parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, and the like), which process various computer-executable instructions to control the operation of the computing system 1000 and to enable techniques for, or in which can be embodied, gesture recognition in the presence of saturation. Alternatively or additionally, the computing system 1000 can be implemented with any one or combination of hardware, firmware, or fixed logic circuitry that is implemented in connection with processing and control circuits which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes a computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control module, code that is native to a particular device, a hardware abstraction layer for a particular device, and so on.

The device applications 1018 also include any system components, engines, or managers to optimize operation of the multi-radar system 102. In this example, the device applications 1018 includes the radar-based application 206 and the optimization controller 220 of FIG. 2.

CONCLUSION

Although techniques using, and apparatuses including, a multi-radar system have been described in language specific to features, it is to be understood that the subject of the appended claims is not necessarily limited to the specific features. Rather, the specific features are disclosed as example implementations of a multi-radar system.

Some examples are described below:

Example 1: A method performed by a multi-radar system implemented within a device, the multi-radar system comprising two or more radar circuits at different positions on the device, the method comprising:
causing a first radar circuit of the two or more radar circuits to be in a first operational state;
causing a second radar circuit of the two or more radar circuits to be in a second operational state;
detecting a trigger event that represents a change in an operating environment of the multi-radar system; and
responsive to detecting the trigger event, selectively altering operation of at least one of the first radar circuit or the second radar circuit, the selective altering comprising at least one of:
causing the first radar circuit to be in a third operational state that is different than the first operational state; or causing the second radar circuit to be in a fourth operational state that is different than the second operational state.

Example 2: The method of example 1, wherein the selective altering is effective to alter an amount of power consumed by the multi-radar system.

Example 3: The method of example 1 or 2, wherein the detecting the trigger event comprises at least one of the following:
the detection of a user not being present;
the detection of the user being present but outside a specified range;
the detection of the user approaching the device;
the detection of the user preparing for a gesture;
the detection of the user having started performing a gesture;
the detection of a movement or rotation of the device;
the detection of the available power being below a predetermined threshold;
the detection of an activation of a different radar-based application; or
the detection of the expiry of timer.

Example 4: The method of any preceding example, wherein the first operational state or the second operational state is an off state, a low-power state, a low-power state, a pre-gesture-detection state, a gesture recognition state, or a presence detection state.

Example 5: The method of any preceding example, wherein:
the first operational state comprises an off state;
the second operational state comprises a pre-gesture-detection state;
the detecting the trigger event comprises detecting, based on the second radar circuit being in the pre-gesture detection state, a user preparing to perform a gesture; and
the selective altering of the operation of at least one of the first radar circuit or the second radar circuit comprises causing both the first radar circuit and the second radar circuit to operate according to a gesture-recognition state to enable the first radar circuit and the second radar circuit to recognize the gesture performed by the user, the third operational state and the fourth operational state comprising the gesture-recognition state.

Example 6: The method of example 5, wherein the gesture-recognition state is associated with a higher frame rate than the pre-gesture-detection state.

Example 7: The method of example 1, wherein:
the first operational state comprises a high-power state;
the second operational state comprises a low-power state, the low-power state consuming less power than the high-power state;
the detecting of the trigger event comprises detecting a change in an orientation of the device; and
the selective altering of the operation of at least one of the first radar circuit or the second radar circuit comprises:
causing the first radar circuit to operate according to the low-power state, the third operational state comprising the low-power state; and
causing the second radar circuit to operate according to the high-power state, the fourth operational state comprising the high-power state.

Example 8: The method of example 7, wherein:
the low-power state is associated with a slower analog-to-digital converter sampling rate than the high-power state; and
the low-power state is associated with a smaller amount of transmit power than the high-power state.

Example 9: The method of example 1, wherein:
the first operational state comprises an off state;
the second operational state comprises a presence-detection state, the presence-detection state consuming a larger amount of power relative to the off state;
the detecting of the trigger event comprises detecting, based on the second radar circuit being in the presence-detection state, a presence of a user; and
the selective altering of the operation of at least one of the first radar circuit or the second radar circuit comprises:
causing the first radar circuit to operate according to a gesture-recognition state, the third operational state comprising the gesture-recognition state, the gesture-recognition state having a slower analog-to-digital converter sampling rate than the presence-detection state; and
causing the second radar circuit to operate according to the gesture-recognition state, the fourth operational state comprising the gesture-recognition.

Example 10: The method of any preceding example, further comprising:
accepting power data from a power circuit of the device;
accepting sensor data from a sensor of the device; and
accepting radar data from the two or more radar circuits,
wherein detecting the trigger event comprises at least one of:
detecting a change in the power data;
detecting a change in the sensor data;
detecting a change in the radar data; or
detecting an expiration of a timer.

Example 11: The method of any preceding example, further comprising:
determining operational variables associated with the two or more radar circuits;
determining at least one optimization parameter associated with the multi-radar system;
determining at least one constraint associated with the multi-radar system; and
executing a cost function to determine the third operational state and the fourth operational state that maximizes the at least one optimization parameter in context of the at least one constraint.

Example 12: The method of example 11, wherein the at least one optimization parameter comprises a signal-to-noise ratio performance and the at least one constraint comprises an available amount of power provided by the device.

Example 13: The method of example 11 or 12, wherein the at least one optimization parameter comprises at least one of the following: angular estimation performance, an F-score, range resolution, Doppler resolution, coverage volume, or responsiveness.

Example 14: The method of any preceding example, wherein the device comprises:
a smartphone;
a smart speaker;
a smart thermostat;
a smart watch;
a gaming system; or
a home appliance.

Example 15: The method of any preceding example, wherein:
the first radar circuit is configured to have a first antenna pattern; and
the second radar circuit is configured to have a second antenna pattern that at least partially overlaps the first antenna pattern.

Example 16: The method of any preceding example, wherein:
the two or more radar circuits each comprise:
at least one antenna; and
at least one transceiver coupled to the at least one antenna; and
either:
the two or more radar circuits each comprise at least one processor coupled to the at least one transceiver; or
the multi-radar system comprises a processor that is coupled to the two or more radar circuits.

Example 17: The method of example 16, wherein:
the at least one antenna comprises:
at least one transmit antenna; and
at least two receive antennas forming a linear antenna array; and
the linear antenna array of the first radar circuit is oriented ninety degrees with respect to the linear antenna array of the second radar circuit.

Example 18: An apparatus comprising:
a multi-radar system comprising two or more radar circuits and a controller, the multi-radar system configured to perform any of the methods of examples 1 to 17.

The invention claimed is:

1. A method performed by a multi-radar system implemented within a device, the multi-radar system comprising two or more radar circuits at different positions on the device, the method comprising:
causing a first radar circuit of the two or more radar circuits to be in a first operational state;
causing a second radar circuit of the two or more radar circuits to be in a second operational state;
detecting a trigger event that represents a change in an operating environment of the multi-radar system; and
responsive to detecting the trigger event, selectively altering operation of at least one of the first radar circuit or the second radar circuit, the selective altering comprising at least one of:
causing the first radar circuit to be in a third operational state that is different than the first operational state; or
causing the second radar circuit to be in a fourth operational state that is different than the second operational state;
wherein the method further comprises executing a cost function to determine at least one of the third operational state or the fourth operational state that maximizes at least one optimization parameter associated with the multi-radar system in context of at least one constraint associated with the multi-radar system.

2. The method of claim 1, wherein the selective altering is effective to alter an amount of power consumed by the multi-radar system.

3. The method of claim 1, wherein the detecting the trigger event comprises at least one of the following:
the detection of a user not being present;
the detection of the user being present but outside a specified range;
the detection of the user approaching the device;
the detection of the user preparing for a gesture;
the detection of the user having started performing the gesture;
the detection of a movement or rotation of the device;
the detection of available power being below a predetermined threshold;
the detection of an activation of a different radar-based application; or
the detection of an expiry of a timer.

4. The method of claim 1, wherein the first operational state or the second operational state is an off state, a low-power state, a low-power state, a pre-gesture-detection state, a gesture recognition state, or a presence detection state.

5. The method of claim 1, wherein:
the first operational state comprises an off state;
the second operational state comprises a pre-gesture-detection state;
the detecting the trigger event comprises detecting, based on the second radar circuit being in the pre-gesture detection state, a user preparing to perform a gesture; and
the selective altering of the operation of at least one of the first radar circuit or the second radar circuit comprises causing both the first radar circuit and the second radar circuit to operate according to a gesture-recognition state to enable the first radar circuit and the second radar circuit to recognize the gesture performed by the user, the third operational state and the fourth operational state comprising the gesture-recognition state.

6. The method of claim 5, wherein the gesture-recognition state is associated with a higher frame rate than the pre-gesture-detection state.

7. The method of claim 1, wherein:
the first operational state comprises a high-power state;
the second operational state comprises a low-power state, the low-power state consuming less power than the high-power state;
the detecting of the trigger event comprises detecting a change in an orientation of the device; and
the selective altering of the operation of at least one of the first radar circuit or the second radar circuit comprises:
causing the first radar circuit to operate according to the low-power state, the third operational state comprising the low-power state; and
causing the second radar circuit to operate according to the high-power state, the fourth operational state comprising the high-power state.

8. The method of claim 7, wherein:
the low-power state is associated with a slower analog-to-digital converter sampling rate than the high-power state; and
the low-power state is associated with a smaller amount of transmit power than the high-power state.

9. The method of claim 1, wherein:
the first operational state comprises an off state;
the second operational state comprises a presence-detection state, the presence-detection state consuming a larger amount of power relative to the off state;
the detecting of the trigger event comprises detecting, based on the second radar circuit being in the presence-detection state, a presence of a user; and
the selective altering of the operation of at least one of the first radar circuit or the second radar circuit comprises:
causing the first radar circuit to operate according to a gesture-recognition state, the third operational state comprising the gesture-recognition state, the gesture-recognition state having a slower analog-to-digital converter sampling rate than the presence-detection state; and
causing the second radar circuit to operate according to the gesture-recognition state, the fourth operational state comprising the gesture-recognition.

10. The method of claim 1, further comprising:
accepting power data from a power circuit of the device;
accepting sensor data from a sensor of the device; and
accepting radar data from the two or more radar circuits, wherein detecting the trigger event comprises at least one of:
detecting a change in the power data;
detecting a change in the sensor data;
detecting a change in the radar data; or
detecting an expiration of a timer.

11. The method of claim 1, wherein the at least one optimization parameter comprises a signal-to-noise ratio performance and the at least one constraint comprises an available amount of power provided by the device.

12. The method of claim 1, wherein the at least one optimization parameter comprises at least one of the following: angular estimation performance, an F-score, range resolution, Doppler resolution, coverage volume, or responsiveness.

13. An apparatus comprising:
a multi-radar system comprising:
two or more radar circuits at different positions on the apparatus, the two or more radar circuits comprising a first radar circuit and a second radar circuit; and
a controller configured to:
cause the first radar circuit to be in a first operational state and the second radar circuit to be in a second operational state;
detect a trigger event that represents a change in an operating environment of the multi-radar system; and
responsive to detecting the trigger event, selectively alter operation of at least one of the first radar circuit or the second radar circuit to cause at least one of:
the first radar circuit to be in a third operational state that is different than the first operational state; or
the second radar circuit to be in a fourth operational state that is different than the second operational state;
wherein the controller is further configured to: execute a cost function to determine at least one of the third operational state or the fourth operational state that maximizes at least one optimization parameter associated with the multi-radar system in context of at least one constraint associated with the multi-radar system.

14. The apparatus of claim 13, wherein the controller is configured to alter an amount of power consumed by the multi-radar system responsive to detecting the trigger event.

15. The apparatus of claim 13, wherein:
the first radar circuit is configured to have a first antenna pattern; and
the second radar circuit is configured to have a second antenna pattern that at least partially overlaps the first antenna pattern.

16. The apparatus of claim 13, wherein a linear antenna array of the first radar circuit is oriented ninety degrees with respect to a linear antenna array of the second radar circuit.

17. The apparatus of claim 13, wherein the two or more radar circuits each comprise:
at least one antenna;
at least one transceiver coupled to the at least one antenna; and
at least one processor coupled to the at least one transceiver.

18. The apparatus of claim 13, wherein:
the two or more radar circuits each comprise:
at least one antenna; and
at least one transceiver coupled to the at least one antenna; and
the multi-radar system comprises a processor that is coupled to each transceiver of the two or more radar circuits.

19. The apparatus of claim 13, wherein the apparatus comprises:
a smartphone;
a smart speaker;
a smart thermostat;
a smart watch;
a gaming system; or
a home appliance.

20. The apparatus of claim 13, wherein the at least one optimization parameter comprises a signal-to-noise ratio performance and the at least one constraint comprises an available amount of power provided by the apparatus.

* * * * *